United States Patent
Lin et al.

(10) Patent No.: US 11,158,055 B2
(45) Date of Patent: Oct. 26, 2021

(54) UTILIZING A NEURAL NETWORK HAVING A TWO-STREAM ENCODER ARCHITECTURE TO GENERATE COMPOSITE DIGITAL IMAGES

(71) Applicant: Adobe Inc., San Jose, CA (US)

(72) Inventors: Zhe Lin, Fremont, CA (US); Jianming Zhang, Campbell, CA (US); He Zhang, San Jose, CA (US); Federico Perazzi, San Jose, CA (US)

(73) Assignee: ADOBE INC., San Jose, CA (US)

( * ) Notice: Subject to any disclaimer, the term of this patent is extended or adjusted under 35 U.S.C. 154(b) by 129 days.

(21) Appl. No.: 16/523,465

(22) Filed: Jul. 26, 2019

(65) Prior Publication Data
US 2021/0027470 A1      Jan. 28, 2021

(51) Int. Cl.
*G06K 9/46*      (2006.01)
*G06T 7/10*      (2017.01)
(Continued)

(52) U.S. Cl.
CPC .................. *G06T 7/10* (2017.01); *G06N 3/04* (2013.01); *G06N 3/082* (2013.01); *G06T 11/60* (2013.01)

(58) Field of Classification Search
CPC .. G06K 1/00; G06K 3/00; G06K 5/00; G06K 7/00; G06K 9/00; G06K 2209/01;
(Continued)

(56) References Cited

U.S. PATENT DOCUMENTS

2003/0202697 A1* 10/2003 Simard .............. G06K 9/00456
                                                    382/195
2015/0237324 A1*  8/2015 Zhang .................... H04N 13/15
                                                    375/240.24
(Continued)

FOREIGN PATENT DOCUMENTS

CN          109671102      *   4/2019

OTHER PUBLICATIONS

Image blending and compositing. In http://inst.eecs.berkeley.edu/cs194-26/fa18/Lectures/blending.pdf. Fall 2015.
(Continued)

*Primary Examiner* — Quan M Hua
(74) *Attorney, Agent, or Firm* — Keller Jolley Preece

(57) ABSTRACT

The present disclosure relates to utilizing a neural network having a two-stream encoder architecture to accurately generate composite digital images that realistically portray a foreground object from one digital image against a scene from another digital image. For example, the disclosed systems can utilize a foreground encoder of the neural network to identify features from a foreground image and further utilize a background encoder to identify features from a background image. The disclosed systems can then utilize a decoder to fuse the features together and generate a composite digital image. The disclosed systems can train the neural network utilizing an easy-to-hard data augmentation scheme implemented via self-teaching. The disclosed systems can further incorporate the neural network within an end-to-end framework for automation of the image composition process.

20 Claims, 14 Drawing Sheets

(51) Int. Cl.
*G06N 3/04* (2006.01)
*G06N 3/08* (2006.01)
*G06T 11/60* (2006.01)

(58) Field of Classification Search
CPC .. G06K 9/00456; G06K 9/00442; G06K 9/38;
G06K 9/46; G06K 9/00463; G06K 9/20;
G06K 9/4628; G06K 9/627; G06K
9/6256; G06K 9/623; G06K 9/6215;
G06K 9/6259; G06K 9/6273; G06T
2207/20084; G06T 2207/20081; G06T
15/06; G06T 7/11; G06T 7/0002; G06T
7/0012; G06T 7/10; G06T 7/174; G06T
2207/10056; G06T 2207/20132; G06T
7/55; G06T 7/60; G06T 7/62; G06T
15/20; G06T 17/00
See application file for complete search history.

(56) References Cited

U.S. PATENT DOCUMENTS

| | | | |
|---|---|---|---|
| 2018/0101957 A1* | 4/2018 | Talathi | G06T 7/10 |
| 2018/0232887 A1* | 8/2018 | Lin | G06N 3/0454 |
| 2019/0026550 A1* | 1/2019 | Yang | G06N 3/0454 |
| 2019/0114774 A1 | 4/2019 | Zhang | |
| 2019/0220977 A1* | 7/2019 | Zhou | G06T 5/50 |
| 2019/0295228 A1* | 9/2019 | Liu | H04N 19/139 |
| 2020/0218961 A1* | 7/2020 | Kanazawa | G06T 5/002 |

OTHER PUBLICATIONS

Opencv laplacian pyramid blending. In https://docs.opencv.org/3.1.0/dc/dff/tutorialpypyramids.html. Downloaded Sep. 13, 2019.
Y. Aksoy, T. Ozan Aydin, and M. Pollefeys. Designing effective inter-pixel information flow for natural image matting. In Proceedings of the IEEE Conference on Computer Vision and Pattern Recognition, pp. 29-37, 2017.
M. Amirul Islam, M. Kalash, and N. D. Bruce. Revisiting salient object detection: Simultaneous detection, ranking, and subitizing of multiple salient objects. In Proceedings of the IEEE Conference on Computer Vision and Pattern Recognition, pp. 7142-7150, 2018.
V. Badrinarayanan, A. Kendall, and R. Cipolla. Segnet: A deep convolutional encoder-decoder architecture for image segmentation. IEEE transactions on pattern analysis and machine intelligence, 39(12):2481-2495, 2017.
J. Burt and E. H. Adelson. A multiresolution spline with application to image mosaics. ACM transactions on Graphics, 2(4):217-236, 1983.
Q. Chen, T. Ge, Y. Xu, Z. Zhang, X. Yang, and K. Gai. Semantic human matting. In 2018 ACM Multimedia Conference on Multimedia Conference, pp. 618-626. ACM, 2018.
Q. Chen, D. Li, and C.-K. Tang. Knn matting. IEEE transactions on pattern analysis and machine intelligence, 35(9):2175-2188, 2013.
M.-M. Cheng, N. J. Mitra, X. Huang, P. H. Torr, and S.-M. Hu. Global contrast based salient region detection. IEEE Transactions on Pattern Analysis and Machine Intelligence, 37(3):569-582, 2015.
D. Cho, Y.-W. Tai, and I. Kweon. Natural image matting using deep convolutional neural networks. In European Conference on Computer Vision, pp. 626-643. Springer, 2016.
E. L. Denton, S. Chintala, R. Fergus, et al. Deep generative image models using a laplacian pyramid of adversarial networks. In Advances in neural information processing systems, pp. 1486-1494, 2015.
D. Dwibedi, I. Misra, and M. Hebert. Cut, paste and learn: Surprisingly easy synthesis for instance detection. In Proceedings of the IEEE International Conference on Computer Vision, pp. 1301-1310, 2017.
K. He, J. Sun, and X. Tang. Guided image filtering. In European conference on computer vision, pp. 1-14. Springer, 2010.
Q. Hou, M.-M. Cheng, X. Hu, A. Borji, Z. Tu, and P. Torr. Deeply supervised salient object detection with short connections. In IEEE CVPR, pp. 3203-3212, 2017.
G. Huang, Z. Liu, K. Q. Weinberger, and L. van der Maaten. Densely connected convolutional networks.arXiv preprint arXiv:1608.06993, 2016.
J. Jia, J. Sun, C.-K. Tang, and H.-Y. Shum. Drag-and-drop pasting. ACM Transactions on Graphics (TOG), 25(3):631-637, 2006.
J. Johnson, A. Alahi, and L. Fei-Fei. Perceptual losses for real-time style transfer and super-resolution. In European Conference on Computer Vision, pp. 694-711. Springer, 2016.
W.-S. Lai, J.-B. Huang, N. Ahuja, and M.-H. Yang. Deep laplacian pyramid networks for fast and accurate super-resolution. In Proceedings of the IEEE conference on computer vision and pattern recognition, pp. 624-632, 2017.
C. Ledig, L. Theis, F. Huszar, J. Caballero, A. Cunningham, A. Acosta, A. Aitken, A. Tejani, J. Totz, Z. Wang, et al. Photo-realistic single image super-resolution using a generative adversarial network. In Proceedings of the IEEE conference on computer vision and pattern recognition, pp. 4681-4690, 2017.
A. Levin, D. Lischinski, and Y. Weiss. A closed-form solution to natural image matting. IEEE transactions on pattern analysis and machine intelligence, 30(2):228-242, 2008.
O. M. Parkhi, A. Vedaldi, and A. Zisserman. Deep face recognition. In Proceedings of the British Machine Vision Conference (BMVC), 2015.
F. Perazzi, P. Krahenbuhl, Y. Pritch, and A. Hornung. Saliency filters: Contrast based filtering for salient region detection. In2012 IEEE conference on computer vision and pattern recognition, pp. 733-740. IEEE, 2012.
P. Perez, M. Gangnet, and A. Blake. Poisson image editing. ACM Transactions on graphics (TOG), 22(3):313-318, 2003.
O. Ronneberger, P. Fischer, and T. Brox. U-net: Convolutional networks for biomedical image segmentation. In International Conference on Medical image computing and computer-assisted intervention, pp. 234-241. Springer, 2015.
G. Ros, L. Sellart, J. Materzynska, D. Vazquez, and A. M. Lopez. The synthia dataset: A large collection of synthetic images for semantic segmentation of urban scenes. In Proceedings of the IEEE conference on computer vision and pattern recognition, pp. 3234-3243, 2016.
E. Shahrian, D. Rajan, B. Price, and S. Cohen. Improving image matting using comprehensive sampling sets. In Proceedings of the IEEE Conference on Computer Vision and Pattern Recognition, pp. 636-643, 2013.
X. Shen, A. Hertzmann, J. Jia, S. Paris, B. Price, E. Shechtman, and I. Sachs. Automatic portrait segmentation for image stylization. In Computer Graphics Forum, vol. 35, pp. 93-102. Wiley Online Library, Eurographics 2016.
X. Shen, X. Tao, H. Gao, C. Zhou, and J. Jia. Deep automatic portrait matting. In European Conference on Computer Vision, pp. 92-107. Springer, 2016.
K. Sunkavalli, M. K. Johnson, W. Matusik, and H. Pfister. Multiscale image harmonization. In ACM Transactions on Graphics (TOG), vol. 29, p. 125. ACM, 2010.
R. Szeliski, M. Uyttendaele, and D. Steedly. Fast poisson blending using multi-splines. In 2011 IEEE International Conference on Computational Photography (ICCP), pp. 1-8. IEEE, 2011.
Y.-H. Tsai, X. Shen, Z. Lin, K. Sunkavalli, X. Lu, and M.-H. Yang. Deep image harmonization. In Proceedings of the IEEE Conference on Computer Vision and Pattern Recognition, pp. 3789-3797, 2017.
Y.-H. Tsai, X. Shen, Z. Lin, K. Sunkavalli, and M.-H. Yang. Sky is not the limit: semantic-aware sky replacement. SIGGRAPH 2016 Technical Paper, Jul. 24-28, 2016, Anaheim, CA.
M. Uyttendaele, A. Eden, and R. Skeliski. Eliminating ghosting and exposure artifacts in image mosaics. In Proceedings of the 2001 IEEE Computer Society Conference on Computer Vision and Pattern Recognition. CVPR 2001, vol. 2, pp. II-II. IEEE, 2001.
J. Wang, M. F. Cohen, et al. Image and video matting: a survey. Foundations and Trends in Computer Graphics and Vision, 3(2):97-175, 2008.

(56) References Cited

OTHER PUBLICATIONS

L. Wang, L. Wang, H. Lu, P. Zhang, and X. Ruan. Saliency detection with recurrent fully convolutional networks. In European conference on computer vision, pp. 825-841. Springer, 2016.

H. Wu, S. Zheng, J. Zhang, and K. Huang. Gp-gan: Towards realistic high-resolution image blending. arXiv preprint arXiv:1703.07195, 2017.

N. Xu, B. Price, S. Cohen, and T. Huang. Deep image matting. In Proceedings of the IEEE Conference on Computer Vision and Pattern Recognition, pp. 2970-2979, 2017.

C. Yang, L. Zhang, H. Lu, X. Ruan, and M.-H. Yang. Saliency detection via graph-based manifold ranking. In Proceedings of the IEEE conference on computer vision and pattern recognition, pp. 3166-3173, 2013.

J. Zhang and S. Sclaroff. Saliency detection: A boolean map approach. In Proceedings of the IEEE international conference on computer vision, pp. 153-160, 2013.

R. Zhang, P. Isola, A. A. Efros, E. Shechtman, and O. Wang. The unreasonable effectiveness of deep features as a perceptual metric. In Proceedings of the IEEE Conference on Computer Vision and Pattern Recognition, pp. 586-595, 2018.

J.-Y. Zhu, P. Krahenbuhl, E. Shechtman, and A. A. Efros. Learning a discriminative model for the perception of realism in composite images. In Proceedings of the IEEE International Conference on Computer Vision, pp. 3943-3951, 2015.

Y. Zhu, K. Sapra, F. A. Reda, K. J. Shih, S. D. Newsam, A. Tao, and B. Catanzaro. Improving semantic segmentation via video propagation and label relaxation. CoRR, abs/1812.01593, 2018.

Chen Bor-Chun et al: "Toward Realistic Image Compositing With Adversarial Learning", 2019 IEEE/CVF Conference on Computer Vision and Pattern Recognition (CVPR), IEEE, Jun. 15, 2019, pp. 8407-8416, XP033686368.

Mastan Indra Deep et al: "Multi-Level Encoder-Decoder Architectures for Image Restoration", 2019 IEEE/CVF Conference on Computer Vision and Pattern Recognition Workshops (CVPRW), IEEE, Jun. 16, 2019 pp. 1728-1737, XP033746996.

Combined Search and Examination Report as received in UK application GB 2007986.9 dated Jan. 11, 2021.

\* cited by examiner

| Foreground Encoder (FGE) | |
|---|---|
| Layer | Output Size (C,W,H) |
| Input (FG) | (4,384,384) |
| FGE-Conv1-BN-Relu | (64,192,192) |
| FGE -Dense1 (12) | (96,192,192) |
| FGE -TD1 | (128,96,96) |
| FGE -Dense2 (12) | (160,96,96) |
| FGE -TD2 | (196,48,48) |
| FGE -Dense3 (16) | (256,48,48) |

| Background Encoder (BGE) | |
|---|---|
| Layer | Output Size (C,W,H) |
| Input (BG) | (4,384,384) |
| BGE-Conv1-BN-Relu | (64,192,192) |
| BGE -Dense1 (12) | (96,192,192) |
| BGE -TD1 | (128,96,96) |
| BGE -Dense2 (12) | (160,96,96) |
| BGE -TD2 | (196,48,48) |
| BGE -Dense3 (16) | (256,48,48) |

| Decoder | |
|---|---|
| Layer | Output size (C,W,H) |
| D-Concat1 | (512, 48,48) |
| D-TU1 | (128, 96, 96) |
| D-Non-local | (128, 96, 96) |
| D-Concat2 | (448, 96, 96) |
| D-Dense1 (12) | (480, 96, 96) |
| D-TU2 | (128, 192, 192) |
| D-Dense2 (12) | (160, 192, 192) |
| D-Concat3 | (356,192,192) |
| D-TU3 | (128, 384, 384) |
| D-Conv1-Relu | (16, 384, 384) |
| D-Conv2 | (3, 384, 384) |
| D-Tanh | (3, 384, 384) |

Fig. 4

| | Copy-Paste | Feathering | Lap-Pyramid | Closed | KNN | Info-Flow | Our |
|---|---|---|---|---|---|---|---|
| PSNR (dB) | 25.55 | 25.43 | 25.54 | 25.67 | 25.68 | 25.56 | 26.06 |
| SSIM | 0.9243 | 0.9255 | 0.9258 | 0.9287 | 0.9279 | 0.9278 | 0.9291 |

*Fig. 7*

| | Lap-Pyramid | Closed | Info-Flow | Copy-Paste | Single-Enc | Our |
|---|---|---|---|---|---|---|
| Average rank | 4.71 | 4.21 | 5.11 | 3.17 | 3.96 | 2.84 |

Fig. 8

| | wo-DataAug | Single-Enc | wo-RefNet | Our |
|---|---|---|---|---|
| PSNR (dB) | 25.05 | 25.69 | 25.08 | 26.06 |
| SSIM | 0.9203 | 0.92183 | 0.9205 | 0.9291 |

UTILIZING A NEURAL NETWORK HAVING A TWO-STREAM ENCODER ARCHITECTURE TO GENERATE COMPOSITE DIGITAL IMAGES

BACKGROUND

Recent years have seen significant improvement in hardware and software platforms that perform various tasks for editing digital images. For example, many conventional systems perform image compositing, combining regions from different digital images to generate a new composite digital image. To illustrate, some conventional systems can generate a composite digital image by overlaying an image of a foreground object (e.g., a person) portrayed in one digital image onto a scene (e.g., a background) portrayed in another digital image. Thus, the resulting composite digital image can have the appearance that the image of the foreground object was actually captured against the background.

Despite these advances, however, conventional image composition systems suffer from several technological shortcomings that result in inaccurate and inflexible operation. For example, conventional image composition systems often fail to accurately generate composite digital images that realistically portray a foreground object from a first digital image against a background from a second digital image. To illustrate, many conventional systems generate a composite digital image by extracting the region of the digital image containing the foreground object and then pasting the region directly onto the desired background. Such a cut-and-paste approach, however, typically results in unnatural artifacts along the boundary of the foreground object as the pixels along the boundary amount to a linear combination of both the foreground object and the background. Some conventional image composition systems seek to address boundary artifacts by implementing low-level image blending methods (e.g., Poisson blending, Laplacian pyramid blending, feathering, guided filtering, etc.). However, these methods often introduce other undesirable effects, such as color distortion or non-smooth halo artifacts, etc. Thus, such conventional systems can introduce additional inaccuracies into the final composite digital image.

In addition to accuracy concerns, conventional image composition systems are also inflexible. For example, conventional image composition systems are often inflexible in that they fail to generate composite digital images without guidance provided via manual user input. To illustrate, as an alternative to low-level image blending methods, some conventional systems utilize image matting methods to combat boundary artifacts. Image matting, however, typically requires human input (e.g., a trimap) to identify the foreground, the background, and the uncertain regions to process. Indeed, many conventional systems fail to complete many other essential editing steps of the image composition process (e.g., segmentation, matting, foreground color decontamination) without significant user input. Further, many conventional systems fail to adapt to the limited availability of training data, resulting in minimal training of the models used to generate composite digital images.

These, along with additional problems and issues, exist with regard to conventional image composition systems.

SUMMARY

One or more embodiments described herein provide benefits and/or solve one or more of the foregoing or other problems in the art with systems, methods, and non-transitory computer-readable media that utilize a multi-level fusion neural network having a two-stream encoder architecture to accurately generate realistic composite digital images. For example, in one or more embodiments, a system provides a foreground image and a background image to a multi-level fusion neural network. The multi-level fusion neural network can use two separate encoders to extract multi-scale features from each of the foreground and background images separately. The multi-level fusion neural network can then use a decoder to generate the composite digital image based on the multi-scale features, providing a natural blending between objects extracted from the foreground image and a scene depicted in the background image. In one or more embodiments, the system trains the multi-level fusion neural network to generate composite digital images via an easy-to-hard data augmentation scheme implemented via self-teaching. In some embodiments, the system incorporates the multi-level fusion neural network within a deep learning image compositing framework that provides automatic, end-to-end digital image compositing. In this manner, the system can flexibly generate composite digital image that accurately portray foreground objects against backgrounds.

To illustrate, in one or more embodiments, the system identifies a foreground image, a background image, and a segmentation mask corresponding to the foreground image. The system can then generate a composite digital image based on the foreground image, the background image, and the segmentation mask. In particular, the system can utilize a foreground encoder of the multi-level fusion neural network to generate a foreground feature map based on the foreground image and the segmentation mask. The system can further utilize a background encoder of the multi-level fusion neural network to generate a background feature map based on the background image and the segmentation mask. Subsequently, the system can utilize a decoder of the multi-level fusion neural network to generate the composite digital image based on the foreground feature map and the background feature map.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4 illustrates multiple tables containing neural network layers included in the foreground encoder, the background encoder, and the decoder of the multi-level fusion neural network in accordance with one or more embodiments;

FIG. 7 illustrates a table reflecting experimental results regarding the effectiveness of the image composition system in accordance with one or more embodiments;

FIG. 8 illustrates another table reflecting additional experimental results regarding the effectiveness of the image composition system in accordance with one or more embodiments;

FIG. 9 illustrates an additional table reflecting further experimental results regarding the effectiveness of the image composition system in accordance with one or more embodiments;

DETAILED DESCRIPTION

Figure 1:
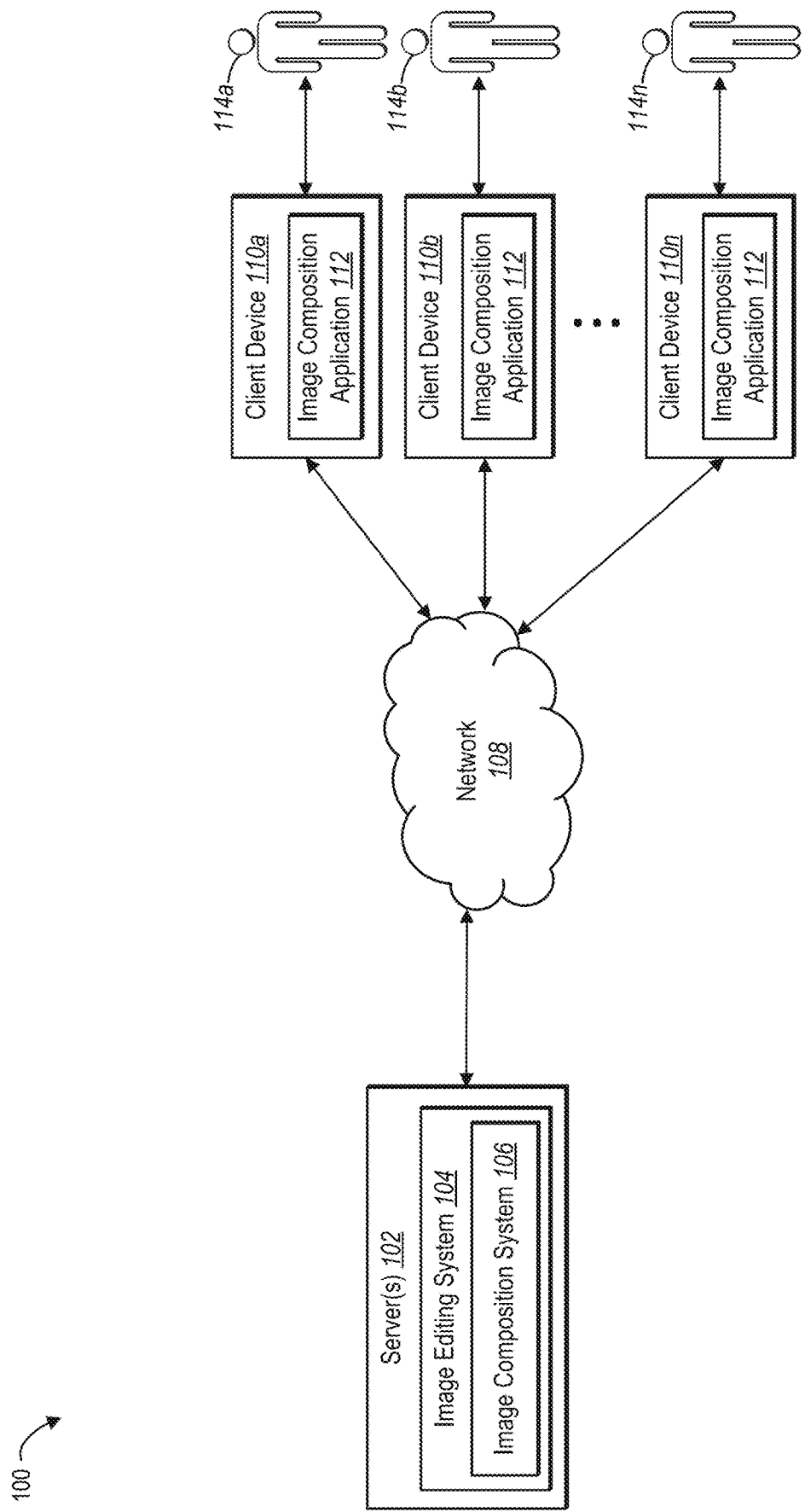
FIG. 1 illustrates an example environment in which an image composition system can operate in accordance with one or more embodiments.

One or more embodiments described herein include an image composition system that utilizes a multi-level fusion neural network having a two-stream encoder architecture to accurately generate digital composite images that realistically blend foreground objects with a background. For example, the image composition system can provide a foreground image and a background image to a multi-level fusion neural network to generate a composite digital image. The multi-level fusion neural network can implement a two-stream encoder pipeline to extract different levels of features maps for each image and then use a decoder to fuse the feature maps level-by-level to generate the composite digital image. The composite digital image can portray, for example, one or more objects extracted from the foreground image against a scene from the background image. In one or more embodiments, the image composition system implements a self-teaching strategy to progressively train the multi-level fusion neural network via an easy-to-hard data augmentation scheme. In some embodiments, the image composition system implements the multi-level fusion neural network as part of a deep learning image compositing framework that provides end-to-end automation of the image compositing process.

To provide an example, in one or more embodiments, the image composition system identifies a foreground image, a background image, and a segmentation mask corresponding to the foreground image. The image composition system can then generate a composite digital image. In particular, the image composition system can generate a foreground feature map based on the foreground image and the segmentation mask using a foreground encoder of a multi-level fusion neural network. The image composition system can further generate a background feature map based on the background image and the segmentation mask using a background encoder of the multi-level fusion neural network. Subsequently, the image composition system can generate the composite digital image based on the foreground feature map and the background feature map using a decoder of the multi-level fusion neural network.

As just mentioned, in one or more embodiments, the image composition system utilizes a multi-level fusion neural network having two encoders to generate a composite digital image that combines a foreground image and a background image. Indeed, in one or more embodiments, the multi-level fusion neural network includes a foreground encoder and a background encoder to generate separate feature maps corresponding to the foreground image and the background image, respectively. The multi-level fusion neural network can then use a decoder to generate the final composite digital image based on the feature maps.

In one or more embodiments, the multi-level fusion neural network further utilizes skip links to pass layer-specific feature maps between the encoders and the decoder. For example, the multi-level fusion neural network can provide at least one layer-specific feature map from each of the foreground and background encoders (e.g., generated at the same encoder level) to the decoder (e.g., to a particular layer of the decoder). Accordingly, the decoder can generate the composite digital image based on the layer-specific feature maps in addition to the feature maps generated by the foreground encoder and the background encoder.

As mentioned above, in one or more embodiments, the image composition system trains the multi-level fusion neural network to generate composite digital images using an easy-to-hard data augmentation scheme implemented via self-teaching. For example, the image composition system can first train the multi-level fusion neural network to generate composite digital images based on easy digital images (e.g., that include foreground images that portray a foreground object against a pure color background). The image composition system can then utilize the semi-trained multi-level fusion neural network to generate harder training images (e.g., that include foreground images that portray a foreground object against a background that varies in detail—in other words, a background that is not a pure color). The image composition system can then use the hard training images to further train the multi-level fusion neural network to generate composite digital images based on hard digital images. Thus, the image composition system can utilize the multi-level fusion neural network to generate training images that are then used to further train the multi-level fusion neural network to process more difficult (i.e., more complex) images.

As further mentioned above, in one or more embodiments, the image composition system implements the multi-level fusion neural network within a deep learning image compositing framework that provides end-to-end functionality for the image compositing process. Indeed, as previously mentioned, the multi-level fusion neural network can utilize a segmentation mask, in addition to the foreground and background images, in order to generate the composite digital image. Accordingly, in some embodiments, the image composition system generates the segmentation mask that is then provided to the multi-level fusion neural network. For example, in one or more embodiments, the image composition system generates a segmentation mask corresponding to a foreground image using a foreground segmentation neural network. In some embodiments, the image composition system can further modify the segmentation mask (e.g., refine details along the boundaries of a foreground object portrayed in the segmentation mask) using a mask refinement neural network. The image composition system can then provide the modified segmentation mask to the multi-level fusion neural network along with the foreground and background images for generating the composite digital image.

The image composition system provides several advantages over conventional systems. For example, the image composition system improves accuracy. In particular, by using a multi-level fusion neural network with a two-stream encoder architecture, the image composition system can extract and fuse features from the foreground and background images at different scales. Indeed, the image composition system optimizes the exploitation of contextual and color features from those images, providing a natural blending between the foreground object and the background. In particular, by using the multi-level fusion neural network, the image composition system can remove undesirable artifacts caused by color contamination, aliasing, and inaccuracies of the segmentation mask.

Further, the image composition system improves flexibility. For example, because the multi-level fusion neural network generates more accurate composite digital images, the image composition system requires less guidance via manual user input. In particular, the image composition system can flexibly perform essential editing steps, such as color decontamination and the removal of boundary artifacts automatically. Further, by incorporating the multi-level fusion neural network into an end-to-end framework, the image composition system can perform other essential editing steps, such as segmentation, without requiring user input. Indeed, the image composition system can generate a composite digital image merely based on the provision of a foreground image and a background image. Additionally, the image composition system flexibly adapts to the limited availability of training data, generating additional and more complex training data using the easy-to-hard data augmentation scheme implemented via self-teaching.

As illustrated by the foregoing discussion, the present disclosure utilizes a variety of terms to describe features and benefits of the image composition system. Additional detail is now provided regarding the meaning of these terms. For example, as used herein, the term "composite digital image" refers to a digital image. In particular, a composite digital image can refer to a digital image generated from portions of two or more digital images. For example, a composite digital image can include a digital image comprising a foreground object (e.g., a person) from a first digital image and a scene from a second digital image.

Relatedly, as used herein, the term "foreground image" refers to a digital image portraying a foreground object. In particular, a foreground image can refer to a digital image usable for providing a foreground object for a composite digital image. For example, a foreground image can include a digital image portraying a person or other object that is used to generate a composite digital image having the same portrayal of the person or object.

Similarly, as used herein, the term "background image" refers to a digital image portraying a scene. In particular, a background image can refer to a digital image that portrays a scene usable for providing a background for a composite digital image. For example, a background image can include a digital image portraying a scene that is then used to generate a composite digital image portraying the same scene as a background.

As used herein, the term "segmentation mask" refers to an identification of pixels in an image that represent an object. In particular, a segmentation mask can refer to an image filter useful for partitioning a digital image into separate portions. For example, a segmentation mask can include a filter that corresponds to a digital image (e.g., a foreground image) that identifies a portion of the digital image (i.e., pixels of the digital image) belonging to a foreground object and a portion of the digital image belonging to a background. For example, a segmentation map can refer to a map of the digital image that has an indication for each pixel of whether the pixel is part of an object (e.g., foreground object) or not. In such implementations, the indication can comprise a binary indication (a 1 for pixels belonging to the object and a zero for pixels not belonging to the object). In alternative implementations, the indication can comprise a probability (e.g., a number between 1 and 0) that indicates the likelihood that a pixel belongs to the object. In such implementations, the closer the value is to 1, the more likely the pixel belongs to the foreground or object and vice versa.

Further, as used herein, the term "multi-level fusion neural network" refers to a computer algorithm or model that generates composite digital images. In particular, a multi-level fusion neural network can refer to a computer algorithm that analyzes a foreground image and a background image to generate a composite digital image. For example, a multi-level fusion neural network can refer to a neural network. In one or more embodiments, a multi-level fusion neural network includes a two-stream encoder architecture. For example, the multi-level fusion neural network can include a "foreground encoder" for processing foreground images and a "background encoder" for processing background images.

Additionally, as used herein, the term "foreground segmentation neural network" refers to a computer algorithm or model that generates segmentation masks. In particular, a foreground segmentation neural network can refer to a computer algorithm that analyzes a foreground image to generate a segmentation mask corresponding to the foreground image. For example, the foreground segmentation neural network can generally include a neural network or, more specifically, include a salient object segmentation model—such as a portrait segmentation model.

Further, as used herein, the term "mask refinement neural network" refers to a computer algorithm or model that modifies segmentation masks. In particular, a mask refinement neural network can refer to a computer algorithm that analyzes a segmentation mask to generate a modified (e.g., refined) segmentation mask. For example, the mask refinement neural network can include a neural network.

As used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data.

Additionally, as used herein, the term "feature map" refers to a collection of one or more feature values. In particular, a feature map can refer to a grid, a matrix, a vector, or a different multi-dimension collection of feature values. In addition, a feature map can include positions or places for individual feature values that make up a feature map. For example, a feature map can include feature values corresponding to pixels of a digital image such that the feature map represents the digital image in feature-value form.

Specifically, a "foreground feature map" can refer to a feature map corresponding to a foreground image and a "background feature map" can refer to a feature map corresponding to a background image. Similarly, a "layer-specific feature map" can refer to a feature map generated by a particular neural network layer of an encoder rather than the feature map output by the encoder in its entirety.

Further, as used herein, the term "easy-to-hard data augmentation scheme" refers to a process of training a model. In particular, an easy-to-hard data augmentation scheme can refer to a method of training a model using progressively more complex training data. For example, an easy-to-hard data augmentation scheme can refer to a process of training a model (e.g., a multi-level fusion neural network) to generate composite digital images by training the model using easy digital images (e.g., easy foreground images) and then further training the model using hard digital images (e.g., hard foreground images). More detail regarding the easy-to-hard data augmentation scheme will be provided below.

As used herein, the term "easy foreground image" refers to a digital image having a relatively simple background (e.g., compared to a hard foreground image). In particular, an easy foreground image can refer to a digital image that portrays a foreground object against a relatively simple background and is used to generate a composite digital image portraying the foreground object against another background. For example, an easy foreground image can include a digital image portraying a foreground object against a pure color background. An "easy training foreground image" can refer to an easy foreground image used to train a model to generate composite digital images (e.g., as part of an easy-to-hard data augmentation scheme) based on foreground images having a relatively simple background.

Similarly, as used herein, the term "hard foreground image" can refer to a digital image having a relatively complex background (e.g., compared to an easy foreground image). In particular, a hard foreground image can refer to a digital image that portrays a foreground object against a relatively complex background and is used to generate a composite digital image portraying the foreground object against another background. For example, a hard foreground image can include a digital image portraying a foreground object against a background that varies in detail (i.e., a background that is not a pure color). A "hard training foreground image" can refer to a hard foreground image used to train a model to generate composite digital images (e.g., as part of an easy-to-hard data augmentation scheme) based on foreground images having a relatively complex background.

Additional detail regarding the image composition system will now be provided with reference to the figures. For example, FIG. 1 illustrates a schematic diagram of an exemplary system environment ("environment") 100 in which an image composition system 106 can be implemented. As illustrated in FIG. 1, the environment 100 can include a server(s) 102, a network 108, client devices 110a-110n, and users 114a-114n.

Although the environment 100 of FIG. 1 is depicted as having a particular number of components, the environment 100 can have any number of additional or alternative components (e.g., any number of servers, client devices, or other components in communication with the image composition system 106 via the network 108). Similarly, although FIG. 1 illustrates a particular arrangement of the server(s) 102, the network 108, the client devices 110a-110n, and the users 114a-114n, various additional arrangements are possible.

The server(s) 102, the network 108, and the client devices 110a-110n may be communicatively coupled with each other either directly or indirectly (e.g., through the network 108 discussed in greater detail below in relation to FIG. 12). Moreover, the server(s) 102 and the client devices 110a-110n may include a computing device (including one or more computing devices as discussed in greater detail with relation to FIG. 12).

As mentioned above, the environment 100 includes the server(s) 102. The server(s) 102 can generate, store, receive, and/or transmit data, including composite digital images. For example, the server(s) 102 can receive a foreground image and a background image (and possibly a segmentation mask corresponding to the foreground image) from a client device (e.g., one of the client devices 110a-110n) and transmit a composite digital image back to the client device. In one or more embodiments, the server(s) 102 comprises a data server. The server(s) 102 can also comprise a communication server or a web-hosting server.

As shown in FIG. 1, the server(s) 102 can include an image editing system 104. In particular, the image editing system 104 can provide functionality by which a user (e.g., any of the users 114a-114n) can generate, edit, manage, and/or store digital images. For example, the user 114a can generate or otherwise access one or more digital images using the client device 110a. Subsequently, the user 114a can use the client device 110a to send the digital image(s) to the image editing system 104 hosted on the server(s) 102 via the network 108. The image editing system 104 then provides many options that the user 114a can use to edit the digital image(s), store the digital image(s), and subsequently search for, access, and view the digital image(s).

Additionally, the server(s) 102 include the image composition system 106. In particular, in one or more embodiments, the image composition system 106 uses the server(s) 102 to generate composite digital images. For example, the image composition system 106 can use the server(s) 102 to generate a composite digital image based on a foreground image, a background image, and a segmentation mask corresponding to the foreground image utilizing a multi-level fusion neural network.

For example, in one or more embodiments, the server(s) 102 can identify a foreground image, a background image, and a segmentation mask. The server(s) 102 can then use a foreground encoder of a multi-level fusion neural network to generate a foreground feature map based on the foreground image and the segmentation mask. The server(s) 102 can further use a background encoder of the multi-level fusion neural network to generate a background feature map based on the background image and the segmentation mask. Based on the foreground feature map and the background feature map, the server(s) 102 can generate a composite digital image using a decoder of the multi-level fusion neural network.

In one or more embodiments, the client devices 110a-110n include computer devices that allow users of the devices (e.g., the users 114a-114n) to access, edit, and view digital images, including composite digital images. For example, the client devices 110a-110n can include smartphones, tablets, desktop computers, laptop computers, or other electronic devices. The client devices 110a-110n can include one or more applications (e.g., the image composition application 112) that allow the users 114a-114n to access, edit, and view digital images, including composite digital images. For example, the image composition application 112 can include a software application installed on the client devices 110a-110n. Additionally, or alternatively, the image composition application 112 can include a software application hosted on the server(s) 102, which may be accessed by the client devices 110a-110n through another application, such as a web browser.

The image composition system 106 can be implemented in whole, or in part, by the individual elements of the environment 100. Indeed, although FIG. 1 illustrates the image composition system 106 implemented with regards to the server(s) 102, different components of the image composition system 106 can be implemented in any of the components of the environment 100. In particular, part of, or all of, the image composition system 106 can be implemented by a client device. The components of the image composition system 106 will be discussed in more detail with regard to FIG. 10 below.

Figure 2:
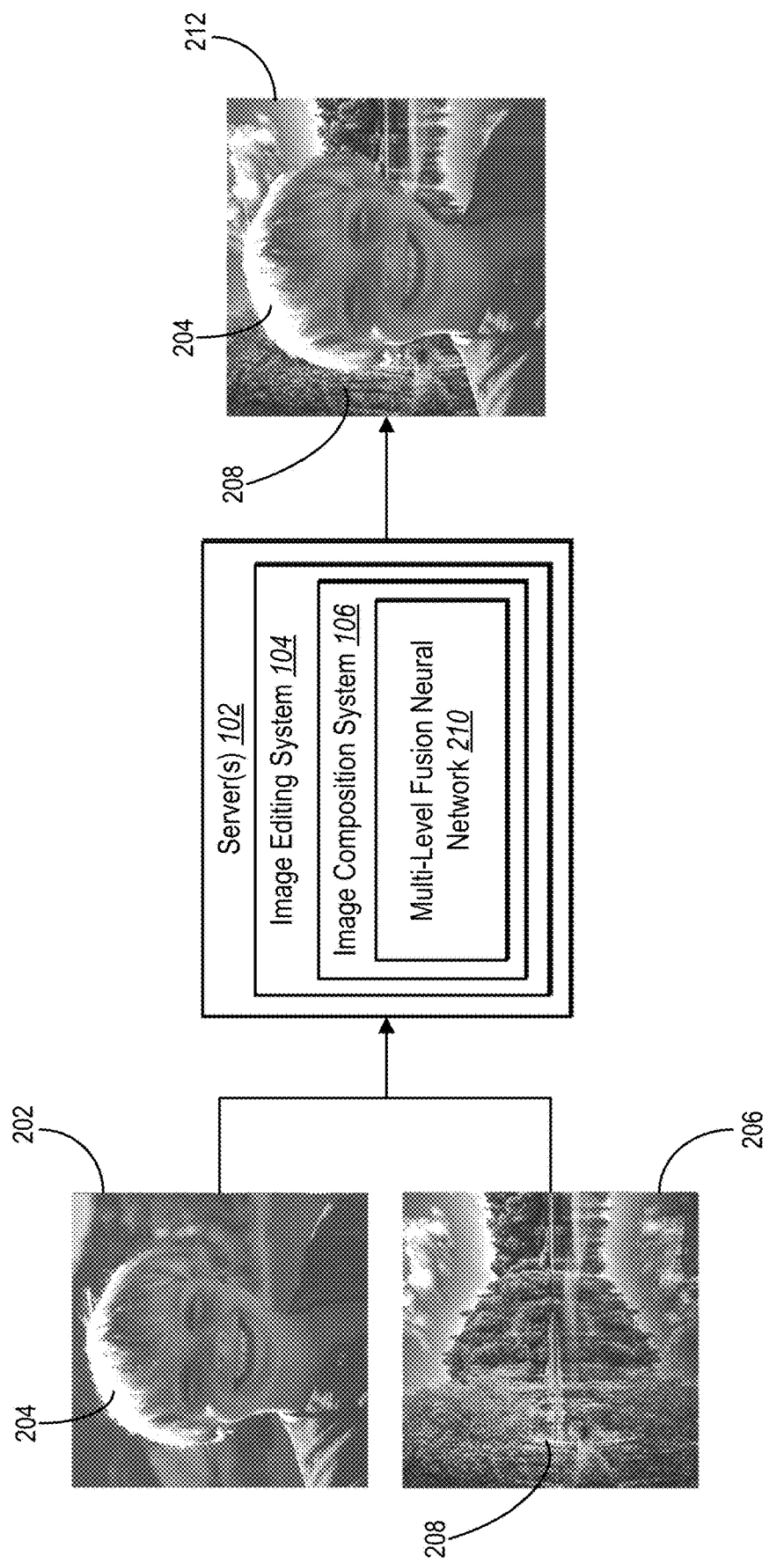
FIG. 2 illustrates a block diagram of an image composition system generating a composite digital image in accordance with one or more embodiments.

As mentioned above, the image composition system 106 can generate composite digital images. FIG. 2 illustrates a block diagram of the image composition system 106 generating a composite digital image 212 in accordance with one or more embodiments. As illustrated in FIG. 2, the image composition system 106 identifies a foreground image 202 and a background image 206. In one or more embodiments, the image composition system 106 identifies the foreground image 202 and the background image 206 by receiving the foreground image 202 and the background image 206 from an external source, such as a third-party system or a client device. In some embodiments, the image composition system 106 identifies the foreground image 202 and the background image 206 from a database storing digital images.

As shown in FIG. 2, the foreground image 202 portrays a foreground object 204 (i.e., a person) against a background. Though the foreground image 202 portrays one foreground object, in one or more embodiments, the image composition system 106 can identify foreground images portraying multiple foreground objects against a background. Further, as shown in FIG. 2, the background image 206 portrays a scene 208 (i.e., a scene that is usable as a background).

As illustrated in FIG. 2, the image composition system 106 utilizes a multi-level fusion neural network 210 to analyze the foreground image 202 and the background image 206. In one or more embodiments, the multi-level fusion neural network 210 includes a two-stream encoder neural network architecture for analyzing the foreground image 202 and the background image 206 separately. The architecture of the multi-level fusion neural network 210 will be discussed in more detail below with regard to FIGS. 3-4.

As shown in FIG. 2, based on the analysis of the foreground image 202 and the background image 206 by the multi-level fusion neural network 210, the image composition system 106 generates the composite digital image 212. In particular, the composite digital image 212 portrays the foreground object 204 from the foreground image 202 positioned over the scene 208 from the background image 206.

It should be noted that, although the scene 208 of the background image 206 does not portray a salient (i.e., discernable) foreground object, in one or more embodiments, the image composition system 106 can identify background images having a scene that portrays one or more salient foreground objects. Indeed, in some embodiments, the image composition system 106 can identify a variety of digital images as a background image. As a result of identifying a particular digital image as a background digital image, the resulting composite digital image can portray a foreground object against the scene portrayed by the background image, whether or not that scene already portrays one or more foreground objects. Further, though the following discusses the image composition system 106 performing image composition in the context of portraits where a person is portrayed as the foreground object, it should be noted that one or more embodiments of the image composition system 106 can generate composite digital images portraying a variety of objects as a foreground object.

Figure 3:
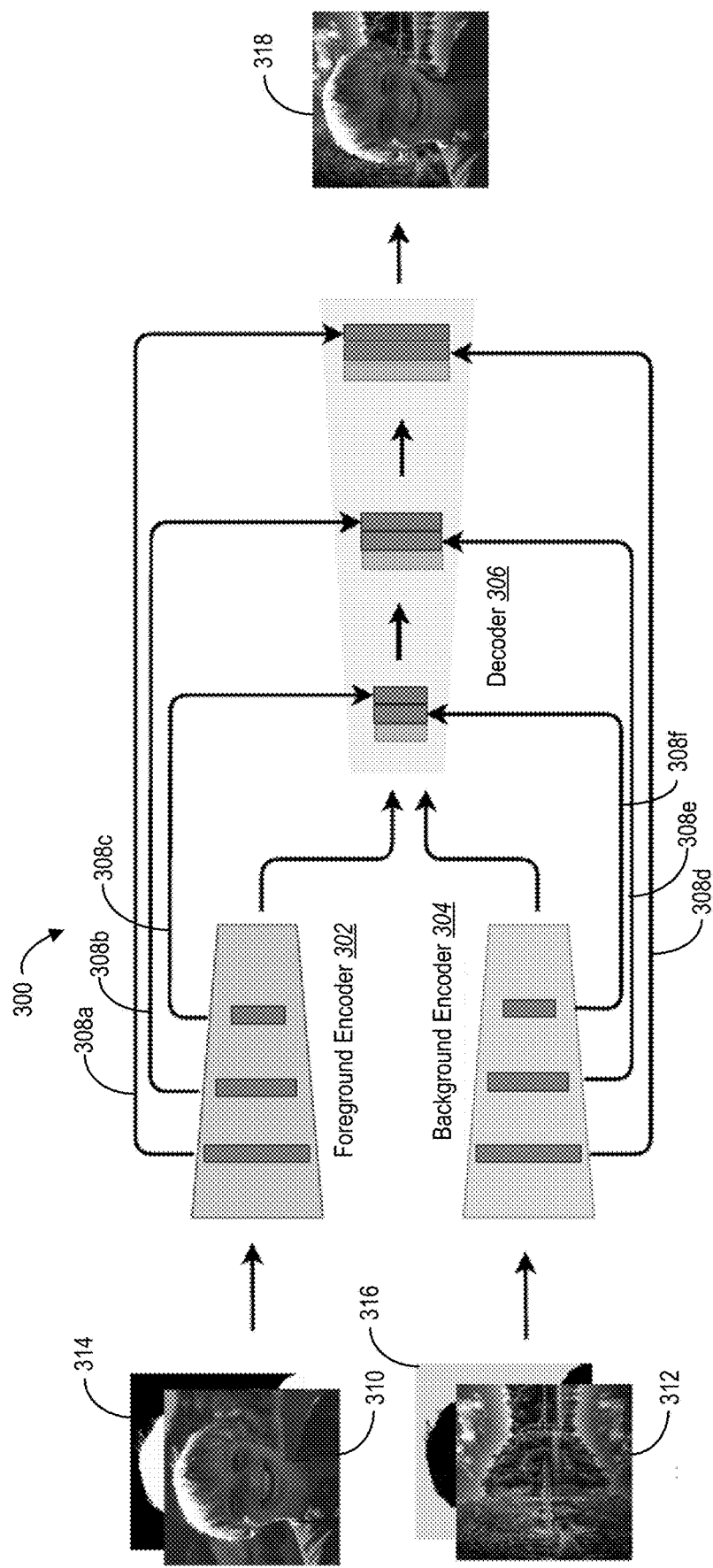
FIG. 3 illustrates a schematic diagram of a multi-level fusion neural network in accordance with one or more embodiments.

As mentioned above, the image composition system 106 can utilize a multi-level fusion neural network to generate a composite digital image from a foreground image and a background image. FIG. 3 illustrates a schematic diagram of a multi-level fusion neural network 300 in accordance with one or more embodiments.

As shown in FIG. 3, the multi-level fusion neural network 300 includes a two-stream encoder architecture. Using the two-stream encoder architecture, the multi-level fusion neural network 300 can analyze foreground images and background images separately. In particular, as shown in FIG. 3, the multi-level fusion neural network 300 includes a foreground encoder 302 for analyzing foreground images and a background encoder 304 for analyzing background images.

As illustrated by FIG. 3, the multi-level fusion neural network 300 further includes a decoder 306 and skip links 308a-308f. The decoder 306 can generate composite digital images based on the analysis of both the foreground encoder 302 and the background encoder 304 (i.e., based on feature maps generated by the foreground and background encoders 302, 304). In one or more embodiments, each of the skip links 308a-308f provides a feature map generated by a particular layer of either the foreground encoder 302 or the background encoder 304 (i.e., a layer-specific feature map) to a particular layer of the decoder 306. In one or more embodiments, one or more of the skip links 308a-308c provides a layer-specific feature map from a neural network layer of the foreground encoder 302 that is at the same encoder level as a neural network layer of the background encoder 304 from which one of the skip links 308d-308f provides a layer-specific feature map. In some embodiments, however, the skip links 308a-308c provide feature layer-specific feature maps generated by neural network layers of the foreground encoder 302 that are at a different encoder level. Additionally, although FIG. 3 illustrates the multi-level fusion neural network 300 having a particular number of skip links, the multi-level fusion neural network 300 can include more or less skip links in some embodiments.

As shown in FIG. 3, the multi-level fusion neural network 300 receives a foreground image 310 and a background image 312 as input. Further, the multi-level fusion neural network 300 receives, or optionally, generates, a segmentation mask 314 and an inverted segmentation mask 316 corresponding to the foreground image 310. In one or more embodiments, the multi-level fusion neural network 300 receives input as a concatenation between a digital image and a corresponding mask. For example, as shown in FIG. 3, the multi-level fusion neural network 300 receives, at the foreground encoder 302, a concatenation of the foreground image 310 and the segmentation mask 314. Similarly, the multi-level fusion neural network 300 receives, at the background encoder 304, a concatenation of the background image 312 and the inverted segmentation mask 316.

The multi-level fusion neural network 300 can use the foreground encoder 302 to generate a foreground feature map based on the foreground image 310 and the segmentation mask 314. The multi-level fusion neural network 300 can further use the background encoder 304 to generate a background feature map (not shown) based on the background image 312 and the inverted segmentation mask 316.

In one or more embodiments, the multi-level fusion neural network 300 provides the foreground feature map and the background feature map generated by the foreground encoder 302 and the background encoder 304, respectively, to the decoder 306. For example, the multi-level fusion neural network 300 can combine the foreground feature map and the background feature map (e.g., via concatenation) and provide the combined feature map to the decoder 306. The multi-level fusion neural network 300 can then utilize the decoder 306 to generate the composite digital image 318 based on the foreground feature map and the background feature map. As shown in FIG. 3, in some embodiments, the multi-level fusion neural network 300 further provides layer-specific feature maps from the foreground encoder 302 and the background encoder 304 to the decoder 306 (i.e., to particular layers of the decoder 306) using the skip links 308a-308f. Accordingly, the decoder 306 can generate the composite digital image 318 further based on the layer-specific feature maps.

By using a multi-level fusion neural network, the image composition system 106 operates more accurately than conventional systems. Indeed, the image composition system 106 improves upon the realism with which foreground objects are portrayed against backgrounds as the multi-level fusion neural network provides a more natural blending at the boundary of the foreground object, removing artifacts caused by color contamination, aliasing, and inaccuracies of the segmentation mask. As will be discussed in more detail below with regards to FIGS. 7-9, the image composition system 106 improves upon the quality of the resulting composite digital images in several metrics.

In one or more embodiments, the foreground encoder and the background encoder of the multi-level fusion neural network each includes a plurality of neural network layers. Further, in some embodiments, the decoder of the multi-level fusion neural network includes a plurality of neural network layers. FIG. 4 illustrates multiple tables containing the neural network layers included in the foreground encoder, the background encoder, and the decoder of the multi-level fusion neural network in accordance with one or more embodiments.

As shown by table 402 and table 404 in FIG. 4, in one or more embodiments, the foreground encoder (referred to as "FGE") and the background encoder (referred to as "BGE") of the multi-level fusion neural network both include the same encoder architecture. In particular, the foreground encoder and the background encoder can include the same number of neural network layers and the same type of neural network layer at each encoder level. In one or more embodiments, however, the foreground encoder and the background encoder include different encoder architectures (i.e., a different number of neural network layers and/or a different neural network layer at one or more of the encoder levels).

As shown by the table 406 in FIG. 4, in one or more embodiments, the decoder of the multi-level fusion neural network includes a plurality of neural network layers, including several neural network layers that perform concatenation operations (i.e., "D-Concat1," "D-Concat2," and "D-Concat3"). Each of these neural network layers concatenates the output of the previous neural network layer (or the foreground and background feature maps output by the foreground and background encoders respectively) with layer-specific feature maps provided by the foreground and background encoders via skip links (as discussed above with reference to FIG. 3). For example, the neural network layer of the decoder labeled "D-Concat1" concatenates the foreground feature map and the background feature map with the layer-specific feature maps generated by neural network layers labeled "FGE-TD2" and "BGE-TD2." Similarly, the neural network layer of the decoder labeled "D-Concat2" concatenates the output of the "D-Non-local" layer with the layer-specific feature maps generated by the "FGE-TD1" and "BGE-TD1" neural network layers of the foreground encoder and background encoder, respectively. Further, the "D-Concat 3" layer of the decoder concatenates the output of the "D-Dense2 (12)" layer as well as the layer-specific feature maps generated by the "FGE-Conv1-BN-Relu" and "BGE-Conv1-BN-Reul" neural network layers of the foreground and background encoder, respectively. As mentioned above, however, the multi-level fusion neural network can include more or less skip links than those discussed with regard to FIGS. 3-4. Further, in one or more embodiments, the multi-level fusion neural network can utilize skip links to provide layer-specific feature maps from different neural network layers of the foreground and background encoders and/or to different neural network layers of the decoder.

Thus, in one or more embodiments, the image composition system 106 identifies a foreground image, a background image, and a segmentation mask corresponding to the foreground image. The image composition system 106 can then generate a composite digital image utilizing a multi-level fusion neural network based on the foreground image, the background image, and the segmentation mask. The algorithms and acts described with reference to FIGS. 3-4 can comprise the corresponding structure for performing a step for generating a composite digital image utilizing a multi-level fusion neural network based on a foreground image, a background image, and a segmentation mask. Additionally, the multi-level fusion neural network architectures described with reference to FIGS. 3-4 can comprise the corresponding structure for performing a step for generating a composite digital image utilizing a multi-level fusion neural network based on a foreground image, a background image, and a segmentation mask.

Figure 5:
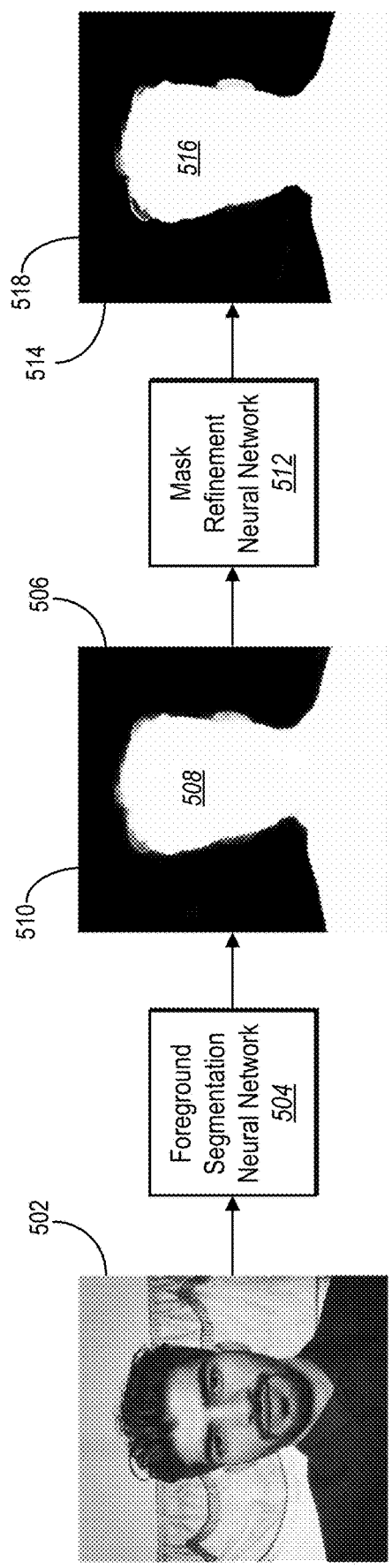
FIG. 5 illustrates a block diagram of generating a segmentation mask in accordance with one or more embodiments.

As mentioned above, in one or more embodiments, the image composition system 106 implements the multi-level fusion neural network within a framework that provides for end-to-end image compositing. Indeed, as mentioned above, in one or more embodiments, the image composition system 106 identifies a segmentation mask that corresponds to a foreground image and uses the segmentation mask, in addition to the foreground image and a background image, in generating a composite digital image. Accordingly, in one or more embodiments, the image composition system generates the segmentation mask corresponding to the foreground image. FIG. 5 illustrates a block diagram of generating a segmentation mask in accordance with one or more embodiments.

As shown in FIG. 5, the image composition system provides a foreground image 502 (i.e., a digital image that will be used as the foreground image by a multi-level fusion neural network to generate a composite digital image) to a foreground segmentation neural network 504. In one or more embodiments, the foreground segmentation neural network 504 includes a model (e.g., a neural network) previously trained to generate segmentation masks. In one or more embodiments, the image composition system 106 trains the foreground segmentation neural network 504 to generate segmentation masks. In some embodiments, however, a third-party system trains the foreground segmentation neural network 504 to generate segmentation masks.

The image composition system 106 utilizes the foreground segmentation neural network 504 to generate a raw segmentation mask 506 based on the foreground image 502. As can be seen in FIG. 5, the raw segmentation mask 506 includes two separate portions—a foreground object 508 and a background 510—corresponding to two portions identified from the foreground image 502 by the foreground segmentation neural network 504. As further seen in FIG. 5, the boundary between the foreground object 508 and the background 510 is not clearly defined (i.e., the boundary has a degree of blurriness). Indeed, in one or more embodiments, the foreground segmentation neural network 504 generates segmentation masks that do not clearly delineate the boundary between the foreground object and the background. For example, in some embodiments, the foreground segmentation neural network 504 processes foreground images at low resolution, resulting in segmentation masks that suffer from up-sampling artifacts, such as jagged boundaries. In some embodiments, however, the foreground segmentation neural network 504 can generate segmentation masks with a clearly defined boundary between the foreground object and the background.

As illustrated by FIG. 5, the image composition system 106 then provides the raw segmentation mask 506 to a mask refinement neural network 512. In one or more embodiments, the mask refinement neural network 512 includes a model (e.g., a neural network) previously trained to modify (e.g., refine) segmentation masks. In one or more embodiments, the image composition system 106 trains the mask refinement neural network 512 to modify segmentation masks. For example, the image composition system 106 can train the mask refinement neural network 512 by using sample image patches of various sizes so that the mask refinement neural network 512 learns to focus on different levels of local details. Indeed, the image composition system 106 can provide the sampled patches and a pre-computed segmentation mask (e.g., generated by the foreground segmentation neural network 504) to the mask refinement neural network 512 and then utilize a determined loss to modify its parameters. In some embodiments, however, a third-party system trains the mask refinement neural network 512 to modify segmentation masks.

In one or more embodiments, the mask refinement neural network 512 has a similar architecture as the foreground segmentation neural network 504, except that the mask refinement neural network 512 takes a four-channel RGB-A digital image as input, where the fourth channel contains a raw segmentation mask (e.g., the raw segmentation mask 506). Further, in some embodiments, the image composition system 106 trains the mask refinement neural network 512 using the same training data and the same loss function used to train the foreground segmentation neural network 504. For example, in one or more embodiments, the image composition system 106 trains the foreground segmentation neural network 504 and the mask refinement neural network 512 using the same cross-entropy loss function.

As shown in FIG. 5, the image composition system 106 utilizes the mask refinement neural network 512 to modify the raw segmentation mask 506. Indeed, the mask refinement neural network 512 generates a modified segmentation mask 514 based on the raw segmentation mask 506. As can be seen in FIG. 5, the modified segmentation mask 514 includes a more clearly defined boundary between the foreground object 516 and the background 518 when compared to the raw segmentation mask 506.

The image composition system 106 can provide the modified segmentation mask 514, along with the corresponding foreground image and a background image, to a multi-level fusion neural network to generate a composite digital image. In one or more embodiments, the image composition system 106 provides the raw segmentation mask 506 to the multi-level fusion neural network to generate the composite digital image. In some embodiments, the image composition system 106 receives or otherwise accesses, rather than generates, a segmentation mask (i.e., a raw segmentation mask or a modified segmentation mask) used in generating a composite digital image. For example, the image composition system 106 can receive a segmentation mask from a user device or third-party system. The image composition system 106 can also access a segmentation mask from a database or other storage.

In one or more embodiments, the image composition system 106 further generates an inverted segmentation mask based on either the raw segmentation mask 506 or the modified segmentation mask 514 (whichever is provided to the multi-level fusion neural network). The image composition system 106 can then provide the inverted segmentation mask to the multi-level fusion neural network for generating the composite digital image.

Thus, in one or more embodiments, the image composition system 106 implements a multi-level fusion neural network within a framework that provides for end-to-end image compositing by incorporating a foreground segmentation neural network within the framework. Additionally, the image composition system 106 can incorporate a mask refinement neural network within the framework. Indeed, in one or more embodiments, a higher quality segmentation mask leads to a higher quality composite digital image. Accordingly, the image composition system 106 can use the framework to identify a foreground image and a background image, generate a segmentation mask corresponding to the foreground image, and then generate a composite digital image based on the foreground image, the background image, and the segmentation mask.

In one or more embodiments, the image composition system 106 trains the components of the end-to-end framework (i.e., the foreground segmentation neural network, the mask refinement neural network, and the multi-level fusion neural network) together. In some embodiments, however, the image composition system 106 trains each component individually. As mentioned above, the image composition system 106 can also rely on a third-party system to train the foreground segmentation neural network and/or the mask refinement neural network.

By employing a framework that provides for end-to-end image compositing, the image composition system 106 operates more flexibly than conventional systems. Indeed, the image composition system 106 improves upon the automation of the image compositing process. Consequently, the image composition system 106 can generate composite digital images without the guidance provided via manual user input that is relied upon by many conventional systems.

Figure 6A:
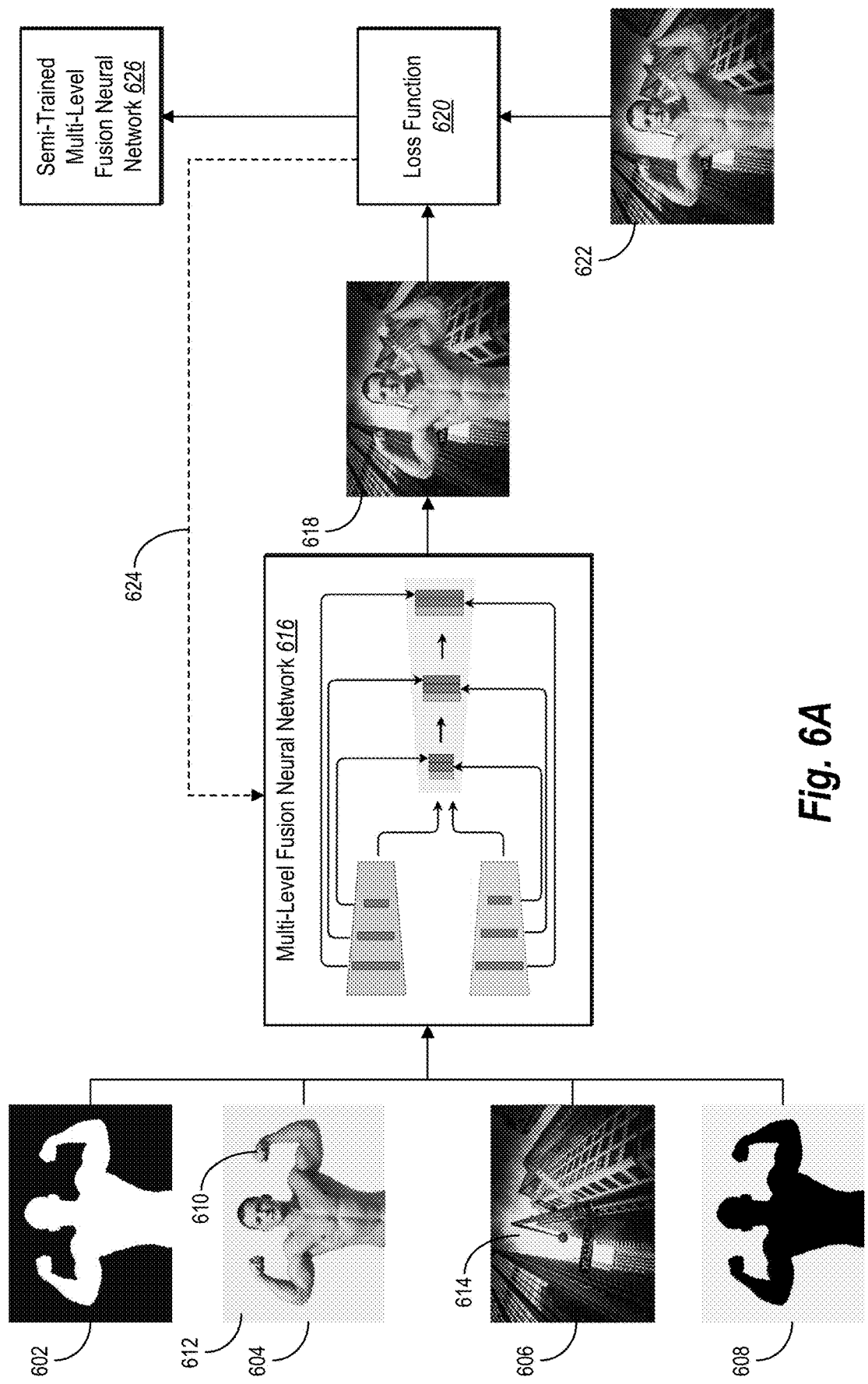
FIGS. 6A-6C illustrate a block diagram of utilizing an easy-to-hard data augmentation scheme to train a multi-level fusion neural network via self-teaching to generate composite digital images in accordance with one or more embodiments.
Figure 6B:
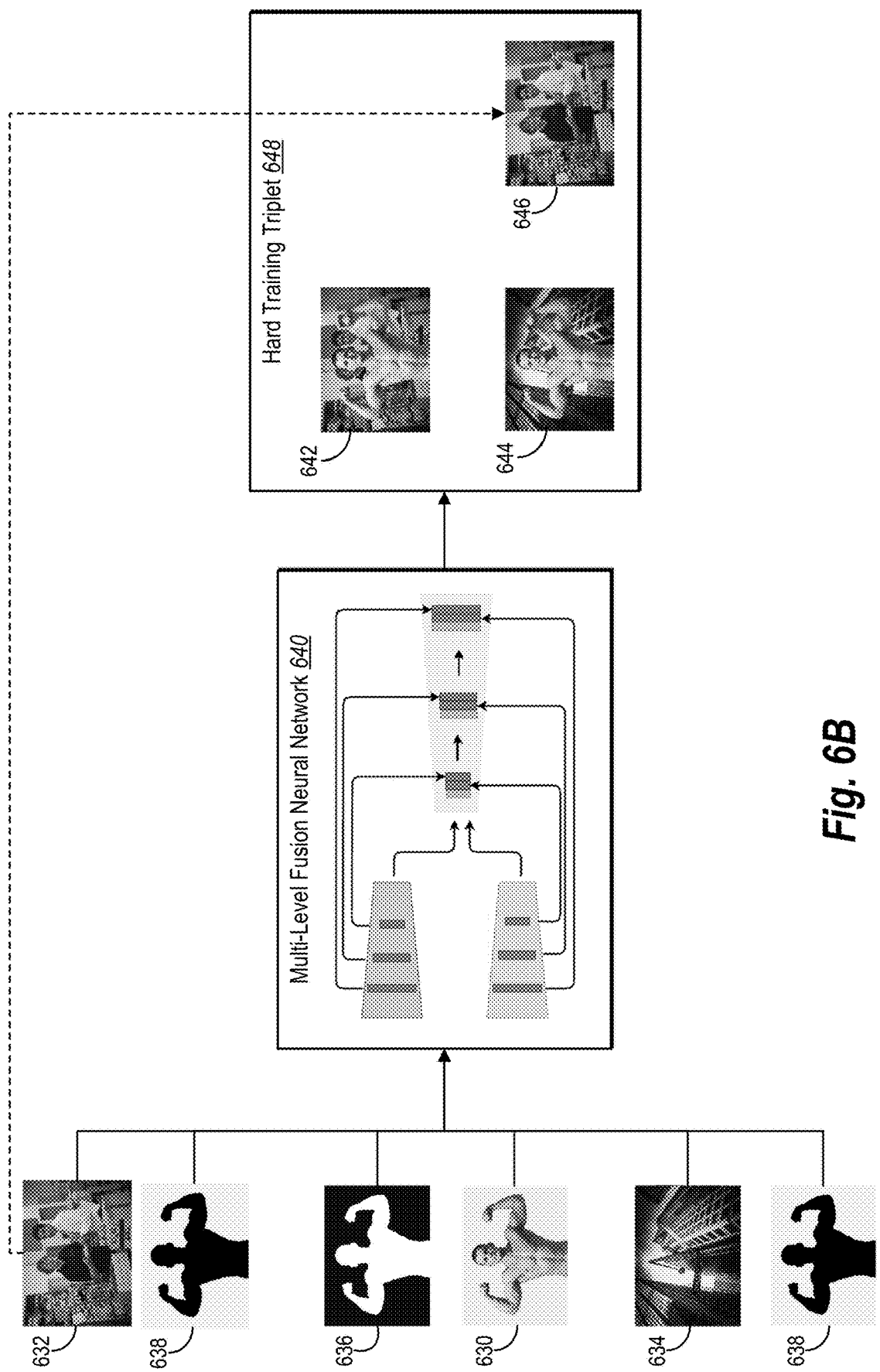
Figure 6C:
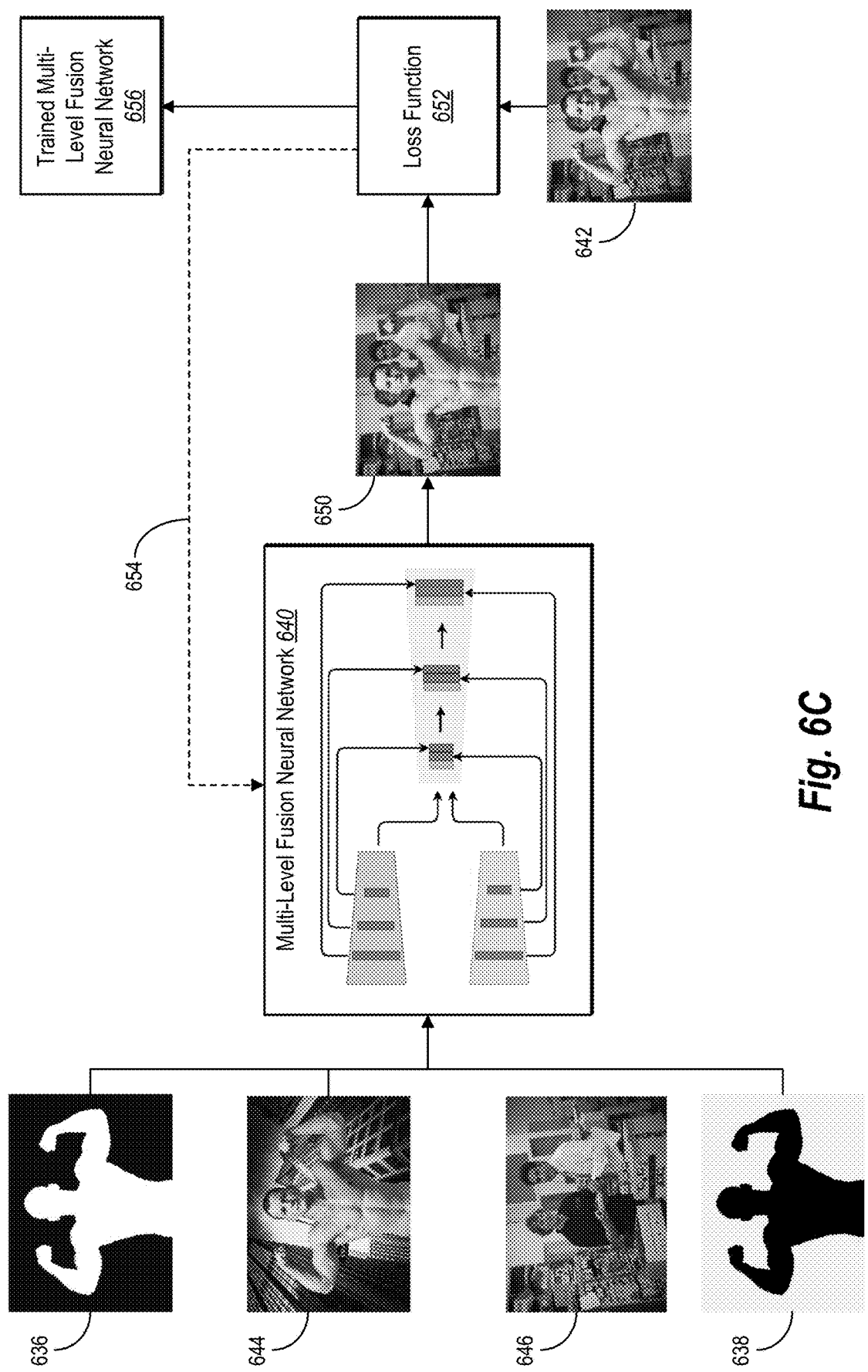

As mentioned above, the image composition system 106 can utilize an easy-to-hard data augmentation scheme to train a multi-level fusion neural network to generate composite digital images. Further, the image composition system 106 can implement the training using a self-teaching approach. FIGS. 6A-6C illustrate a block diagram of utilizing an easy-to-hard data augmentation scheme to train a multi-level fusion neural network, via self-teaching, to generate composite digital images in accordance with one or more embodiments.

In particular, FIG. 6A illustrates a block diagram of the image composition system 106 training a multi-level fusion neural network 616 to generate composite digital images based on easy foreground images in accordance with one or more embodiments. As shown in FIG. 6A, the image composition system 106 implements the training by providing an easy training foreground image 604 to the multi-level fusion neural network 616. The easy training foreground image 604 portrays a foreground object 610 against a pure color background 612. In one or more embodiments, the image composition system 106 generates the easy training foreground image 604 by compositing a matting image (i.e., containing the foreground object 610) from a matting dataset with the pure color background 612 using an alpha channel of the matting image.

As shown in FIG. 6A, the image composition system 106 further provides a training background image 606 to the multi-level fusion neural network 616. The training background image 606 portrays a scene 614 that is to be used as a background of the resulting predicted composite digital image. In one or more embodiments, the image composition system 106 retrieves the training background image 606 from a database of digital images. For example, the image composition system 106 can retrieve a digital image from the internet and use the retrieved digital image as the training background image 606.

As shown in FIG. 6A, the image composition system 106 further provides a training segmentation mask 602 and an inverted training segmentation mask 608 corresponding to the easy training foreground image 604 to the multi-level fusion neural network 616. In one or more embodiments, the image composition system 106 generates the training segmentation mask 602 and the inverted training segmentation mask 608 based on the easy training foreground image 604. In some embodiments, however, the image composition system 106 retrieves, or otherwise accesses the training segmentation mask 602 and/or the inverted training segmentation mask 608 using a third-party system.

The image composition system 106 utilizes the multi-level fusion neural network 616 to generate a predicted composite digital image 618 based on the easy training foreground image 604, the training background image 606, the training segmentation mask 602, and the inverted training segmentation mask 608. In one or more embodiments, the multi-level fusion neural network 616 generates the predicted composite digital image 618 as discussed above with regard to FIGS. 3-4. The image composition system 106 then uses the loss function 620 to determine the loss (i.e., error) resulting from the multi-level fusion neural network 616 based on a comparison between the predicted composite digital image 618 and a target composite digital image 622. In one or more embodiments, the image composition system 106 generates the target composite digital image 622 using the same alpha channel of the matting image used to generate the easy training foreground image 604 (e.g., the alpha channel used to composite the foreground object 610 with the pure color background 612).

In one or more embodiments, the loss function 620 includes multiple various losses. Indeed, the image composition system 106 can determine the loss resulting from the multi-level fusion neural network 616 by determining multiple various losses and then combining those losses. For example, in one or more embodiments, the image composition system 106 determines the loss resulting from the multi-level fusion neural network 616 by comparing the predicted composite digital image 618 and the target composite digital image 622 to determine an L1 loss and a perceptual loss. The image composition system 106 can then combine the L1 loss and the perceptual loss to determine a combined loss as follows:

$$L_{all} = L_1 \lambda_P L_P \quad (1)$$

In equation 1, $\lambda_P$ represents a weight applied to the perceptual loss $L_P$. In one or more embodiments, the image composition system 106 weighs the L1 loss and the perceptual loss the same. In some embodiments, however, the image composition system 106 applies a relatively higher or lower weight to the perceptual loss.

In one or more embodiments, the image composition system 106 determines the perceptual loss by using a pre-trained visual geometry group (VGG) neural network to extract a feature vector for both the predicted composite digital image 618 and the target composite digital image 622. The image composition system 106 then compares the feature vectors to determine the perceptual loss. In one or more embodiments, the image composition system 106 determines the perceptual loss as described by J. Johnson et al., *Perceptual Losses for Real-Time Style Transfer and Super-Resolution*, https://arxiv.org/abs/1603.08155, which is incorporated herein by reference in its entirety. In one or more embodiments, the image composition system evaluates the perceptual loss on the relu 1-1 and relu 2-1 layers of the VGG neural network.

As shown in FIG. 6A, the image composition system 106 then back propagates the determined loss to the multi-level fusion neural network 616 (as indicated by the dashed line 624) to modify its parameters. Consequently, with each iteration of training, the image composition system 106 gradually increases the accuracy with which the multi-level fusion neural network 616 can generate composite digital images based on easy foreground images. As shown, the image composition system 106 can thus generate the semi-trained multi-level fusion neural network 626.

FIG. 6B illustrates a block diagram of the image composition system 106 utilizing a multi-level fusion neural network 640 (i.e., the semi-trained multi-level fusion neural network 626 of FIG. 6A) to generate a hard training triplet 648 for further training the multi-level fusion neural network 640 in accordance with one or more embodiments. As shown, the hard training triplet 648 includes a target composite digital image 642, a hard training foreground image 644, and a training background image 646.

As shown in FIG. 6B, the image composition system 106 generates the hard training triplet 648 based on an easy training foreground image 630, a first training background image 632, a second training background image 634, a segmentation mask 636 corresponding to the easy training foreground image 630, and an inverted segmentation mask 638 corresponding to the easy training foreground image 630. In particular, the image composition system 106 utilizes the multi-level fusion neural network 640 to generate the target composite digital image 642 based on the easy training foreground image 630, the first training background image 632, the segmentation mask 636 and the inverted segmentation mask 638. The image composition system 106 further utilizes the multi-level fusion neural network 640 to generate the hard training foreground image 644 based on the easy training foreground image 630, the second training background image 634, the segmentation mask 636, and the inverted segmentation mask 638. In one or more embodiments, the multi-level fusion neural network 640 generates the target composite digital image 642 and the hard training foreground image 644 as discussed above with regard to FIGS. 3-4. Additionally, the image composition system 106 includes the first training background image 632 in the hard training triplet 648 as the training background image 646.

FIG. 6C illustrates a block diagram of the image composition system 106 further training the multi-level fusion neural network 640 (i.e., the semi-trained multi-level fusion neural network 626 of FIG. 6A), using the hard training triplet 648, to generate composite digital images based on hard foreground images in accordance with one or more embodiments. As shown in FIG. 6C, the image composition system 106 can utilize the multi-level fusion neural network 640 to generate a predicted composite digital image 650 based on the hard training foreground image 644, the training background image 646, the segmentation mask 636, and the inverted segmentation mask 638. In one or more embodiments, the multi-level fusion neural network 640 generates the predicted composite digital image 650 as discussed above with regards to FIGS. 3-4.

The image composition system 106 then uses the loss function 652 to determine the loss resulting from the multi-level fusion neural network 640 based on a comparison between the predicted composite digital image 650 and the target composite digital image 642. In one or more embodiments, the image composition system 106 utilizes the same loss function as described above with regard to FIG. 6A and as expressed in equation 1.

As shown in FIG. 6C, the image composition system 106 then back propagates the determined loss to the multi-level fusion neural network 640 (as indicated by the dashed line 654) to modify its parameters. Consequently, with each iteration of training, the image composition system 106 gradually increases the accuracy with which the multi-level fusion neural network 640 can generate composite digital images based on hard foreground images. As shown, the image composition system 106 can thus generate the trained multi-level fusion neural network 656.

Thus, the image composition system 106 can implement a self-teaching training approach by utilizing a multi-level fusion neural network to generate additional training images and then using those training images to further train the multi-level fusion neural network. Additionally, the image composition system 106 can implement an easy-to-hard data augmentation scheme by increasing the complexity of training images during the training process. By using the self-teaching and easy-to-hard data augmentation, the image composition system 106 operates more flexibly than conventional systems. In particular, the image composition system 106 can flexibly provide extensive training to the multi-level fusion neural network even where the availability of training images is limited. Thus, the image composition system 106 can circumvent the limits on training placed on conventional systems due to a lack of training images.

As mentioned above, utilizing a multi-level fusion neural network allows the image composition system 106 to more accurately generate composite digital images that realistically portray a foreground object from one digital image against a scene (i.e., a background) provided by another digital image. Researchers have conducted studies to determine the accuracy of one or more embodiments of the multi-level fusion neural network used by the image composition system 106. FIGS. 7-9 each illustrate a table reflecting experimental results regarding the effectiveness of the multi-level fusion neural network used by the image composition system in accordance with one or more embodiments.

FIG. 7 illustrates a table reflecting experimental results based on the performance of one or more embodiments of the image composition system 106. The researchers trained the multi-level fusion neural network using a synthesized dataset via the self-teaching easy-to-hard data augmentation scheme discussed above with reference to FIGS. 6A-6C together with a matting-based compositing dataset. The researchers performed optimization using the Adam optimization algorithm.

The table shown in FIG. 7 compares the performance of the image composition system 106 with the performance of one or more other methods typically used by conventional systems. For example, the results also measure the performance of various traditional blending-based compositing methods, such as feathering and Laplacian pyramid blending. The results further show the performance of the matting-based compositing approach using state-of-the-art matting methods, such as Closed-Form (Closed), KNN, and Information-flow (Info-flow). The results include the performance of the copy-paste method as a baseline.

The researchers provided each measured method with the same refined segmentation mask. The researchers trained the foreground segmentation neural network and the mask refinement neural network with the DUTS, MSRA-10K, and Portrait segmentation datasets and optimized the models using the Adam optimization algorithm. For the copy-paste method, the refined segmentation mask is used as the soft alpha matte for the compositing. For the feathering method, the researchers applied Gaussian blur with $\sigma=2$ to soften the mask. For the Laplacian pyramid blending, the researchers used the OpenCV implementation. For the matting-based methods, the researchers binarized the refined segmentation mask and then generated a pseudo-trimap by labeling a narrow band of width 16 as unknown.

As shown in FIG. 7, the results compare the performance of each method using Peak Signal-to-Noise Ratio (PSNR) measured in dB and structural similarity (SSIM). With both metrics, a higher score corresponds to a higher-quality image composition (i.e., better accuracy). As can be seen in FIG. 7, the image composition system 106 performs significantly better than the other models, scoring a 26.06 PSNR and 0.9291 SSIM.

FIG. 8 illustrates another table reflecting additional experimental results comparing the performance of the image composition system 106 with the performance of one or more conventional systems utilizing traditional methods of image composition. In particular, the results shown in FIG. 8 illustrate the perceptual quality provided by each method as gathered via a user study. The user study involved forty-four participants, which included image editing experts. Each participant was shown twenty image sets, each consisting of the foreground images and compositing results of the compared methods. In each image set, the researchers asked the participants to rank the favorite three results. The results shown in FIG. 8 provide the average ranking for the compared methods where a lower average corresponds to better perceptual quality.

Similar to the experiment reflected in FIG. 7, the results compare the performance of the image composition system 106 with the performance of Laplacian pyramid blending (Lap-Pyramid), Closed-Form (Closed), Information-flow (Info-flow) and copy-paste as a baseline. The results further compare performance of the image composition system 106 with the performance of a neural network having a single-steam encoder architecture (Single-Enc).

As shown in FIG. 8, the image composition system 106 provides improved perceptual quality over the other compared methods, achieving an average ranking of 2.84. Among the twenty image sets, the composite digital images generated by the image composition system 106 ranked first on eleven images. By comparison, six of the composite digital images generated by the runner-up method (the copy-paste baseline) ranked first.

FIG. 9 illustrates yet another table reflecting additional experimental results comparing the performance of various embodiments of the image composition system 106. In particular, the results of FIG. 9 reflect several ablation studies in which one or more features of the image composition system 106 have been removed, comparing the resulting performance with one or more embodiments in which the image composition system 106 implements a multi-level fusion neural network within an end-to-end framework trained using the easy-to-hard data augmentation scheme discussed above. Specifically, the results reflect the performance of an embodiment of the image composition system 106 that does not train the multi-level fusion neural network using the easy-to-hard data augmentation scheme (wo-DataAug), an embodiment in which the multi-level fusion neural network includes a single-stream encoder architecture (Single-Enc), and an embodiment in which the image composition system 106 does not refine the segmentation mask using a mask refinement neural network (wo-RefNet). As shown in FIG. 9, the embodiment of the image composition system 106 that includes the aforementioned features performs significantly better than the embodiments having at least one of the features removed achieving a PSNR score of 26.06 and a SSIM score of 0.9291.

Figure 10:
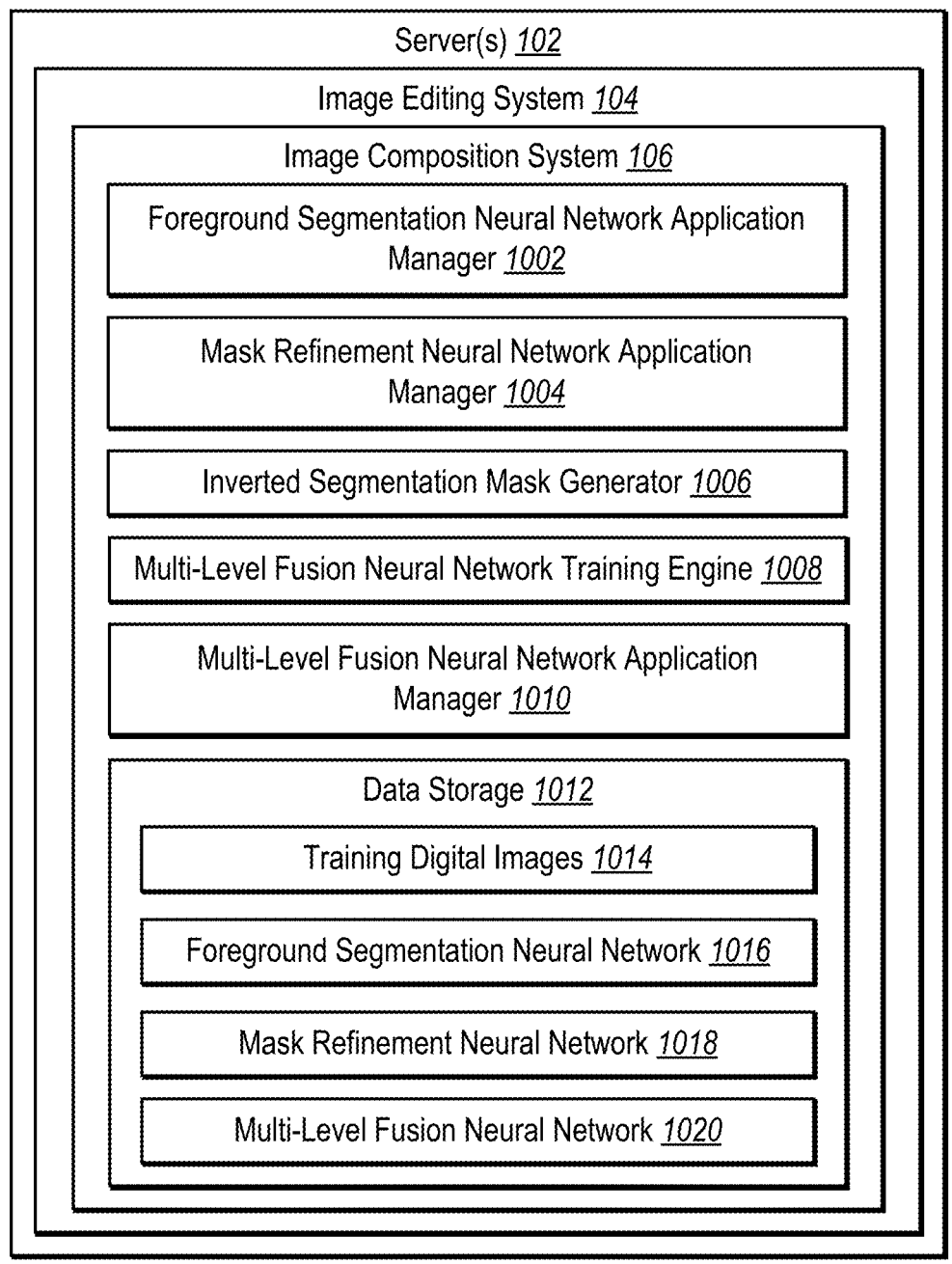
FIG. 10 illustrates an example schematic diagram of an image composition system in accordance with one or more embodiments.

Turning now to FIG. 10, additional detail will now be provided regarding various components and capabilities of the image composition system 106. In particular, FIG. 10 illustrates the image composition system 106 implemented by the server(s) 102 and the image editing system 104. As shown, the image composition system 106 can include, but is not limited to, a foreground segmentation neural network application manager 1002, a mask refinement neural network application manager 1004, an inverted segmentation mask generator 1006, a multi-level fusion neural network training engine 1008, a multi-level fusion neural network application manager 1010, and data storage 1012 (which includes training digital images 1014, a foreground segmentation neural network 1016, a mask refinement neural network 1018, and a multi-level fusion neural network 1020).

As just mentioned, and as illustrated in FIG. 10, the image composition system 106 includes the foreground segmentation neural network application manager 1002. In particular, the foreground segmentation neural network application manager 1002 can receive a foreground image and generate a corresponding segmentation mask utilizing a foreground segmentation neural network. In one or more embodiments, in generating the segmentation mask, the foreground segmentation neural network application manager 1002 can partition the foreground image into two separate portions—a foreground object and a background—corresponding to two portions identified from the foreground image by the foreground segmentation neural network.

As shown in FIG. 10, the image composition system 106 can further include the mask refinement neural network application manager 1004. In particular, the mask refinement neural network application manager 1004 can utilize a mask refinement neural network to modify previously-generated segmentation masks. For example, in one or more embodiments, the mask refinement neural network application manager 1004 receives a segmentation mask generated by the foreground segmentation neural network application manager 1002 (i.e., a raw segmentation mask) and uses the mask refinement neural network to generate to modify the segmentation mask (e.g., by refining the boundary between the foreground object and the background).

Additionally, as shown in FIG. 10, the image composition system 106 includes the inverted segmentation mask generator 1006. In particular, the inverted segmentation mask generator 1006 can generate an inverted segmentation mask corresponding to a previously-generated segmentation mask. For example, in one or more embodiments, the inverted segmentation mask generator 1006 generates an inverted segmentation mask based on the segmentation mask generated by the foreground segmentation neural network application manager 1002. In some embodiments, the inverted segmentation mask generator 1006 generates the inverted segmentation mask based on the segmentation mask generated by the mask refinement neural network application manager 1004.

Further, as shown in FIG. 10, the image composition system 106 includes the multi-level fusion neural network training engine 1008. In particular, the multi-level fusion neural network training engine 1008 can train a multi-level fusion neural network to generate composite digital images. In one or more embodiments, the multi-level fusion neural network training engine 1008 trains the multi-level fusion neural network using an easy-to-hard data augmentation scheme. In some embodiments, the multi-level fusion neural network training engine 1008 trains the multi-level fusion neural network further using a self-teaching approach, using the multi-level fusion neural network to generate additional training data for further training.

As shown in FIG. 10, the image composition system 106 further includes the multi-level fusion neural network application manager 1010. In particular, the multi-level fusion neural network application manager 1010 can utilize the multi-level fusion neural network trained by the multi-level fusion neural network training engine 1008. For example, the multi-level fusion neural network application manager 1010 can identify a foreground image, a background image, and a segmentation mask corresponding to the foreground image and then used the trained multi-level fusion neural network to generate a composite digital image that portrays a foreground object from the foreground image against a scene from the background image.

Further, as shown in FIG. 10, the image composition system 106 includes data storage 1012. In particular, data storage 1012 can include training digital images 1014, the foreground segmentation neural network 1016, the mask refinement neural network 1018, and the multi-level fusion neural network 1020. Training digital images 1014 can include digital images used for training the multi-level fusion neural network (e.g., easy training foreground images and hard training foreground images). Training digital images 1014 can further include the target digital images used for training. The multi-level fusion neural network training engine 1008 can obtain the training digital images from training digital images 1014 when training the multi-level fusion neural network. The foreground segmentation neural network 1016 can store the foreground segmentation neural network used by the foreground segmentation neural network application manager 1002 for generating segmentation masks. Similarly, the mask refinement neural network 1018 can store the mask refinement neural network used by the mask refinement neural network application manager 1004 for modifying segmentation masks. Further, the multi-level fusion neural network 1020 can store the multi-level fusion neural network trained by the multi-level fusion neural network training engine 1008 and used by the multi-level fusion neural network application manager 1010 generate composite digital images.

Each of the components 1002-1020 of the image composition system 106 can include software, hardware, or both. For example, the components 1002-1020 can include one or more instructions stored on a computer-readable storage medium and executable by processors of one or more computing devices, such as a client device or server device. When executed by the one or more processors, the computer-executable instructions of the image composition system 106 can cause the computing device(s) to perform the methods described herein. Alternatively, the components 1002-1020 can include hardware, such as a special-purpose processing device to perform a certain function or group of functions. Alternatively, the components 1002-1020 of the image composition system 106 can include a combination of computer-executable instructions and hardware.

Furthermore, the components 1002-1020 of the image composition system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1020 of the image composition system 106 may be implemented as a stand-alone application, such as a desktop or mobile application. Furthermore, the components 1002-1020 of the image composition system 106 may be implemented as one or more web-based applications hosted on a remote server. Alternatively, or additionally, the components 1002-1020 of the image composition system 106 may be implemented in a suite of mobile device applications or "apps." For example, in one or more embodiments, the image composition system 106 can comprise or operate in connection with digital software applications such as ADOBE® CREATIVE CLOUD® or ADOBE® PHOTOSHOP®. "ADOBE," "CREATIVE CLOUD," and "PHOTOSHOP" are either registered trademarks or trademarks of Adobe Inc. in the United States and/or other countries.

Figure 11:
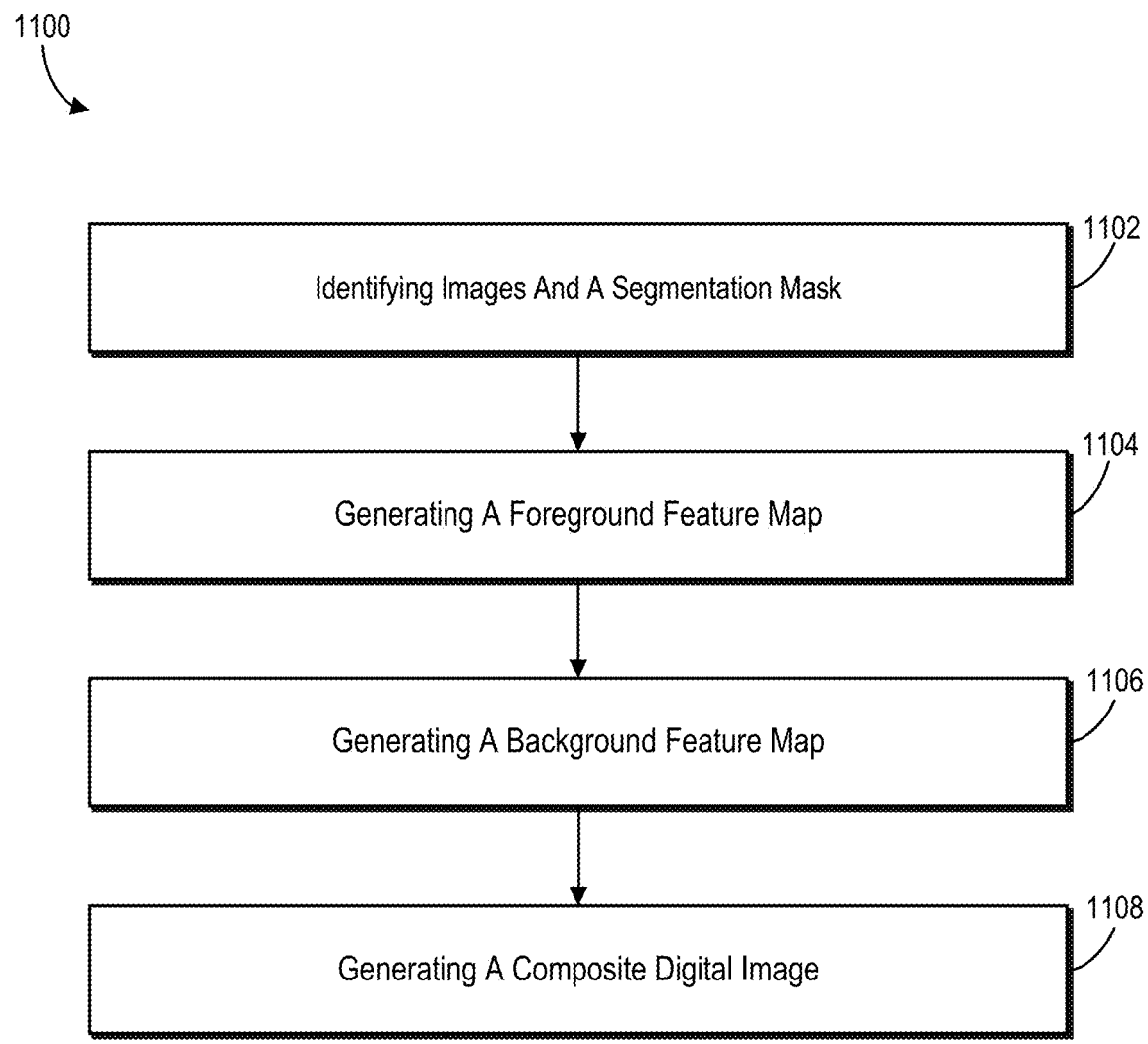
FIG. 11 illustrates a flowchart of a series of acts for generating a composite digital image in accordance with one or more embodiments.

FIGS. 1-10, the corresponding text, and the examples provides a number of different methods, systems, devices, and non-transitory computer-readable media of the image composition system 106. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

As mentioned, FIG. 11 illustrates a flowchart of a series of acts 1100 for generating a composite digital image in accordance with one or more embodiments. While FIG. 11 illustrates acts according to one embodiment, alternative embodiments may omit, add to, reorder and/or modify any of the acts shown in FIG. 11. The acts of FIG. 11 can be performed as part of a method. For example, in some embodiments, the acts of FIG. 11 can be performed, in a digital medium environment for editing digital images, as part of a computer-implemented method. Alternatively, a non-transitory computer-readable medium can store instructions that, when executed by at least one processor, cause a computing device to perform the acts of FIG. 11. In some embodiments, a system can perform the acts of FIG. 11. For example, in one or more embodiments, a system includes at least one memory device comprising a multi-level fusion neural network trained to generate composite digital images, the multi-level fusion neural network comprising a foreground encoder, a background encoder, and a decoder. The system can further include at least one server device that causes the system to perform the acts of FIG. 11.

The series of acts 1100 includes an act 1102 of identifying images and a segmentation mask. For example, the act 1102 involves identifying a foreground image, a background image, and a segmentation mask corresponding to the foreground image. In one or more embodiments, identifying the segmentation mask corresponding to the foreground image comprises generating the segmentation mask based on the foreground image utilizing a foreground segmentation neural network. Indeed, in one or more embodiments, the image composition system 106 identifies a foreground image and a background image and generates the segmentation mask based on the foreground image utilizing a foreground segmentation neural network. In one or more embodiments, the image composition system 106 further modifies the segmentation mask corresponding to the foreground image utilizing a mask refinement neural network. For example, the image composition system 106 can modify a boundary of a foreground object portrayed in the segmentation mask based on the foreground image and the segmentation mask utilizing a mask refinement neural network.

The series of acts 1100 also includes an act 1104 of generating a foreground feature map. For example, the act 1104 involves generating a composite digital image based on the foreground image, the background image, and the segmentation mask by generating a foreground feature map based on the foreground image and the segmentation mask utilizing a foreground encoder of a multi-level fusion neural network.

The series of acts 1100 further includes an act 1106 of generating a background feature map. For example, the act 1106 involves generating the composite digital image based on the foreground image, the background image, and the segmentation mask by further generating a background feature map based on the background image and the segmentation mask utilizing a background encoder of the multi-level fusion neural network. In one or more embodiments, the image composition system 106 additionally generates an inverted segmentation mask based on the segmentation mask corresponding to the foreground image. Accordingly, the image composition system 106 can generate the background feature map based on the background image and the segmentation mask by generating the background feature map based on the background image and the inverted segmentation mask Additionally, the series of acts 1100 includes an act 1108 of generating a composite digital image. For example, the act 1108 involves generating the composite digital image based on the foreground image, the background image, and the segmentation mask by further generating the composite digital image based on the foreground feature map and the background feature map using a decoder of the multi-level fusion neural network. For example, the image composition system 106 can combine the foreground feature map and the background feature map to generate a combined feature map and then generate the composite digital image based on the combined feature map using the decoder of the multi-level fusion neural network. In one or more embodiments, the composite digital image comprises a foreground object from the foreground image portrayed against a scene from the background image.

In one or more embodiments, the image composition system 106 further utilizes skip links to provide the decoder of the multi-level fusion neural network layer with layer-specific feature maps. For example, the image composition system 106 can identify a first layer-specific feature map generated by the foreground encoder and a second layer-specific feature map generated by the background encoder. The image composition system 106 can then provide the first layer-specific feature map and the second layer-specific feature map to a layer of the decoder of the multi-level fusion neural network via skip links. Accordingly, generating the composite digital image based on the foreground feature map and the background feature map using the decoder of the multi-level fusion neural network can include generating the composite digital image further based on the first layer-specific feature map and the second layer-specific feature map using the decoder. In one or more embodiments, a layer of the foreground encoder corresponding to the first layer-specific feature map is at a same encoder level as a layer of the background encoder corresponding to the second layer-specific feature map.

In one or more embodiments, the foreground image comprises a training foreground image and the background image comprises a training background image. Accordingly, the series of acts 1100 can further include acts for training the multi-level fusion neural network. Indeed, the image composition system 106 can train the multi-level fusion neural network to generate composite digital images by comparing the composite digital image to a target composite digital image to determine a loss; and modifying parameters of the multi-level fusion neural network based on the determined loss. In one or more such embodiments, the image composition system 106 can identify the foreground image by generating the foreground image utilizing the multi-level fusion neural network. Further, in one or more such embodiments, the image composition system 106 can generate the target composite digital image utilizing the multi-level fusion neural network.

As mentioned, in one or more embodiments, the series of acts 1100 also includes acts for training a multi-level fusion neural network to generate composite digital images. For example, in one or more embodiments, the image composition system 106 trains the multi-level fusion neural network to generate composite digital images by generating a target composite digital image based on an easy training foreground image and a first training background image utilizing the multi-level fusion neural network; generating a hard training foreground image based on the easy training foreground image and a second training background image utilizing the multi-level fusion neural network; generating a predicted composite digital image based on the hard training foreground image and the first training background image utilizing the multi-level fusion neural network; and modifying parameters of the multi-level fusion neural network based on a comparison of the predicted composite digital image and the target composite digital image. In one or more embodiments, the easy training foreground image comprises a foreground object portrayed against a pure color background. In some embodiments, the hard training foreground image comprises the foreground object portrayed against a background from the second training background image, wherein the background varies in detail.

In one or more embodiments, the acts for training the multi-level fusion neural network to generate composite digital images further includes comparing the predicted composite digital image and the target composite digital image to determine a L1 loss and a perceptual loss; and determining a combined loss based on the L1 loss and the perceptual loss. Accordingly, the image composition system 106 can modify the parameters of the multi-level fusion neural network based on the comparison of the predicted composite digital image and the target composite digital image by modifying the parameters based on the combined loss. In one or more embodiments, determining the combined loss includes applying a weight to the perceptual loss to generate a weighted perceptual loss; and combining the L1 loss and the weighted perceptual loss to generate the combined loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
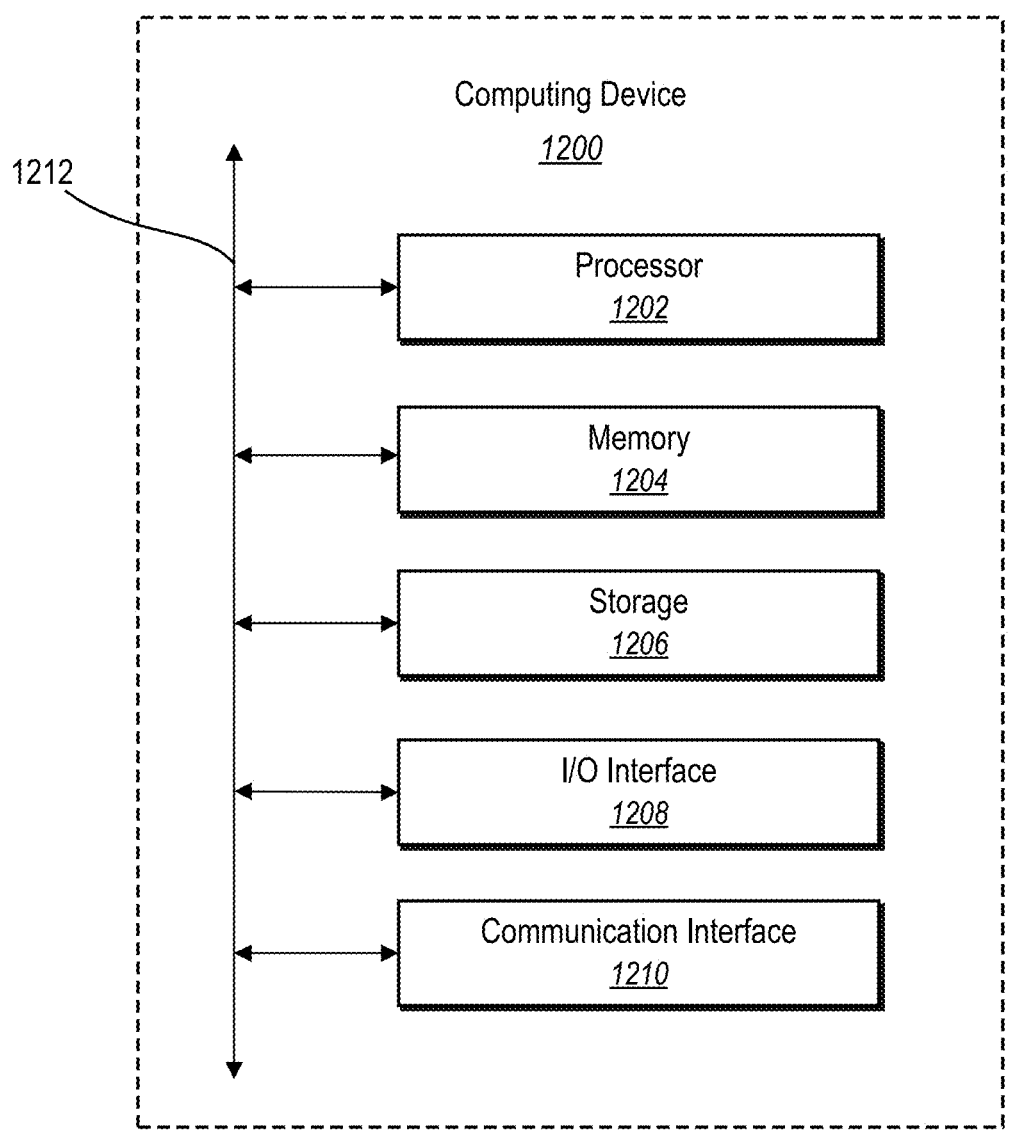
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, and the client devices 110a-110n). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to:
identify a foreground image that depicts at least one foreground object against a first background and a segmentation mask corresponding to the foreground image;
identify a background image that depicts a second background; and
generate a composite digital image that depicts the at least one foreground object against the second background based on the foreground image, the background image, and the segmentation mask by:
generating a foreground feature map based on the foreground image and the segmentation mask utilizing a foreground encoder of a multi-level fusion neural network;
generating a background feature map based on the background image and the segmentation mask utilizing a background encoder of the multi-level fusion neural network; and
generating the composite digital image based on the foreground feature map and the background feature map using a decoder of the multi-level fusion neural network.

2. The non-transitory computer-readable medium of claim 1, further comprising instructions that, when executed by the at least one processor, cause the computing device to generate an inverted segmentation mask based on the segmentation mask corresponding to the foreground image,
wherein generating the background feature map based on the background image and the segmentation mask comprises generating the background feature map based on the background image and the inverted segmentation mask.

3. The non-transitory computer-readable medium of claim 1, wherein the instructions, when executed by the at least one processor, cause the computing device to identify the segmentation mask corresponding to the foreground image by generating the segmentation mask based on the foreground image utilizing a foreground segmentation neural network.

4. The non-transitory computer-readable medium of claim 3, further comprising instructions that, when executed by the at least one processor, cause the computing device to modify the segmentation mask corresponding to the foreground image utilizing a mask refinement neural network.

5. The non-transitory computer-readable medium of claim 1, further comprising instructions that, when executed by the at least one processor, cause the computing device to:
identify a first layer-specific feature map generated by the foreground encoder and a second layer-specific feature map generated by the background encoder; and
provide the first layer-specific feature map and the second layer-specific feature map to a layer of the decoder of the multi-level fusion neural network via skip links,
wherein generating the composite digital image based on the foreground feature map and the background feature map using the decoder of the multi-level fusion neural network comprises generating the composite digital image further based on the first layer-specific feature map and the second layer-specific feature map using the decoder.

6. The non-transitory computer-readable medium of claim 5, wherein a layer of the foreground encoder corresponding to the first layer-specific feature map is at a same encoder level as a layer of the background encoder corresponding to the second layer-specific feature map.

7. The non-transitory computer-readable medium of claim 1,
wherein the foreground image comprises a training foreground image and the background image comprises a training background image; and
further comprising instructions that, when executed by the at least one processor, cause the computing device to train the multi-level fusion neural network to generate composite digital images by:
comparing the composite digital image to a target composite digital image to determine a loss; and
modifying parameters of the multi-level fusion neural network based on the determined loss.

8. The non-transitory computer-readable medium of claim 7, wherein the instructions, when executed by the at least one processor, cause the computing device to identify the foreground image by generating the foreground image utilizing the multi-level fusion neural network.

9. The non-transitory computer-readable medium of claim 7, further comprising instructions that, when executed by the at least one processor, cause the computing device to generate the target composite digital image utilizing the multi-level fusion neural network.

10. A system comprising:
at least one memory device comprising a multi-level fusion neural network trained to generate composite digital images, the multi-level fusion neural network comprising a foreground encoder, a background encoder, and a decoder;
at least one server device that causes the system to:
identify a foreground image that depicts at least one foreground object against a first background;
identify a background image that depicts a second background;
generate a segmentation mask based on the foreground image utilizing a foreground segmentation neural network;
generate a foreground feature map based on the foreground image and the segmentation mask utilizing the foreground encoder of the multi-level fusion neural network;
generate a background feature map based on the background image and the segmentation mask utilizing the background encoder of the multi-level fusion neural network;
combine the foreground feature map and the background feature map to generate a combined feature map; and
generate a composite digital image that depicts the at least one foreground object against the second background based on the combined feature map using the decoder of the multi-level fusion neural network.

11. The system of claim 10, wherein the at least one server device causes the system to train the multi-level fusion neural network to generate composite digital images by:
generating a target composite digital image based on an easy training foreground image and a first training background image utilizing the multi-level fusion neural network;
generating a hard training foreground image based on the easy training foreground image and a second training background image utilizing the multi-level fusion neural network;
generating a predicted composite digital image based on the hard training foreground image and the first training background image utilizing the multi-level fusion neural network; and
modifying parameters of the multi-level fusion neural network based on a comparison of the predicted composite digital image and the target composite digital image.

12. The system of claim 11, wherein:
the easy training foreground image comprises a foreground object portrayed against a pure color background; and
the hard training foreground image comprises the foreground object portrayed against a background from the second training background image, wherein the background varies in detail.

13. The system of claim 11, wherein the at least one server device causes the system to:
compare the predicted composite digital image and the target composite digital image to determine a L1 loss and a perceptual loss; and
determine a combined loss based on the L1 loss and the perceptual loss,
wherein modifying the parameters of the multi-level fusion neural network based on the comparison of the predicted composite digital image and the target composite digital image comprises modifying the parameters based on the combined loss.

14. The system of claim 13, wherein the at least one server device causes the system to determine the combined loss by:
applying a weight to the perceptual loss to generate a weighted perceptual loss; and
combining the L1 loss and the weighted perceptual loss to generate the combined loss.

15. The system of claim 10, wherein the at least one server device causes the system to:
generate an inverted segmentation mask based on the segmentation mask corresponding to the foreground image, and
generate the background feature map based on the background image and the segmentation mask by generating the background feature map based on the background image and the inverted segmentation mask.

16. The system of claim 10, wherein the at least one server device causes the system to modify a boundary of the at least one foreground object portrayed in the segmentation mask based on the foreground image and the segmentation mask utilizing a mask refinement neural network.

17. In a digital medium environment for editing digital images, a computer-implemented method comprising:
identifying a foreground image that depicts at least one foreground object against a first background and a segmentation mask corresponding to the foreground image;
identifying a background image that depicts a second background; and
generating a composite digital image that depicts the at least one foreground object against the second background based on the foreground image, the background image, and the segmentation mask by:
generating a foreground feature map based on the foreground image and the segmentation mask utilizing a foreground encoder of a multi-level fusion neural network;
generating a background feature map based on the background image and the segmentation mask utilizing a background encoder of the multi-level fusion neural network; and
generating the composite digital image based on the foreground feature map and the background feature map using a decoder of the multi-level fusion neural network.

18. The computer-implemented method of claim 17, wherein identifying the segmentation mask corresponding to the foreground image comprises generating the segmentation mask based on the foreground image utilizing a foreground segmentation neural network.

19. The computer-implemented method of claim 18, further comprising modifying the segmentation mask corresponding to the foreground image utilizing a mask refinement neural network.

20. The non-transitory computer-readable medium of claim 1, wherein the instructions, when executed by the at least one processor, cause the computing device to:
identify the background image depicting the second background by identifying the background image depicting one or more additional foreground objects against the second background; and
generate the composite digital image that depicts the at least one foreground object against the second background by generating the digital image that depicts the at least one foreground object and the one or more additional foreground objects against the second background.

* * * * *